US012320154B2

(12) United States Patent
Uyeda et al.

(10) Patent No.: US 12,320,154 B2
(45) **Date of Patent: *Jun. 3, 2025**

(54) WIRELESS LOCKSET WITH TOUCH ACTIVATION

(71) Applicant: ASSA ABLOY Americas Residential Inc., New Haven, CT (US)

(72) Inventors: Alan Uyeda, Irvine, CA (US); Michael Maridakis, Garden Grove, CA (US); Jerome F. Czerwinski, Jr., Ladera Ranch, CA (US); Elliott B. Scheider, Foothill Ranch, CA (US); Troy M. Brown, Lake Forest, CA (US); David K J Kim, Mission Viejo, CA (US)

(73) Assignee: ASSA ABLOY Americas Residential Inc., New Haven, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/418,002

(22) Filed: Jan. 19, 2024

(65) Prior Publication Data

US 2024/0151067 A1 May 9, 2024

Related U.S. Application Data

(63) Continuation of application No. 17/817,703, filed on Aug. 5, 2022, now Pat. No. 11,913,252, which is a (Continued)

(51) Int. Cl.
*G08B 13/04* (2006.01)
*E05B 17/10* (2006.01)
(Continued)

(52) U.S. Cl.
CPC .......... *E05B 47/0001* (2013.01); *E05B 17/10* (2013.01); *E05B 17/22* (2013.01);
(Continued)

(58) Field of Classification Search
USPC ..... 340/542, 686.4, 10.4, 547, 545.3, 545.7, 340/545.9, 555, 568.8, 571, 691.6, 686.3
See application file for complete search history.

(56) References Cited

U.S. PATENT DOCUMENTS

| | | | |
|---|---|---|---|
| 3,733,861 | A | 5/1973 | Lester |
| 3,794,848 | A | 2/1974 | Peters et al. |

(Continued)

FOREIGN PATENT DOCUMENTS

| | | |
|---|---|---|
| CN | 1317066 | 10/2001 |
| CN | 1922353 | 2/2007 |

(Continued)

OTHER PUBLICATIONS

Partial International Search Report for Application No. PCT/US2014/022482 mailed Aug. 13, 2014.

(Continued)

*Primary Examiner* — Daniel Previl
(74) *Attorney, Agent, or Firm* — Merchant & Gould P.C.

(57) ABSTRACT

A wireless electromechanical lock with one or more of an internal antenna, touch activation, and/or a light communication device that acts as a user interface. In some embodiments, the lock utilizes an antenna near the exterior face of the lockset, designed inside the metal body of the lockset itself. A light communication device is provided in some embodiments to communicate information, visually, to the user via animations and dynamic displays of light. In some embodiments, the lockset includes a touch activation capability, which can be used to lock/unlock the lock and/or otherwise provide input.

20 Claims, 23 Drawing Sheets

Related U.S. Application Data continuation of application No. 16/987,053, filed on Aug. 6, 2020, now Pat. No. 11,408,201, which is a continuation of application No. 14/689,766, filed on Apr. 17, 2015, now Pat. No. 10,738,504, which is a continuation of application No. 14/202,047, filed on Mar. 10, 2014, now Pat. No. 9,024,759.

(60) Provisional application No. 61/792,896, filed on Mar. 15, 2013.

(51) Int. Cl.

| | |
|---|---|
| ***E05B 17/22*** | (2006.01) |
| ***E05B 47/00*** | (2006.01) |
| ***E05B 47/02*** | (2006.01) |
| ***E05B 47/06*** | (2006.01) |
| ***E05C 1/02*** | (2006.01) |
| ***G07C 9/00*** | (2020.01) |

(52) U.S. Cl.

CPC ............ *E05B 47/00* (2013.01); *E05B 47/026* (2013.01); *E05B 47/06* (2013.01); *E05C 1/02* (2013.01); *G07C 9/00182* (2013.01); *G07C 9/00904* (2013.01); *G07C 9/00944* (2013.01); *E05B 2047/0053* (2013.01); *E05B 2047/0054* (2013.01); *G07C 2209/62* (2013.01); *Y10T 70/70* (2015.04); *Y10T 292/1014* (2015.04)

(56) References Cited

U.S. PATENT DOCUMENTS

| | | | | |
|---|---|---|---|---|
| RE29,341 | E | 8/1977 | Peters et al. | |
| 4,439,808 | A | 3/1984 | Gillham | |
| 4,485,381 | A | 11/1984 | Lewiner et al. | |
| 4,573,720 | A | 3/1986 | Nicolai | |
| 4,685,316 | A | 8/1987 | Hicks et al. | |
| 4,763,937 | A | 8/1988 | Sittnick, Jr. et al. | |
| 5,000,497 | A | 3/1991 | Geringer et al. | |
| 5,029,912 | A | 7/1991 | Gotanda | |
| 5,088,779 | A | 2/1992 | Weiss | |
| 5,247,282 | A | 9/1993 | Marshall | |
| 5,261,260 | A | 11/1993 | Lin | |
| 5,386,713 | A | 2/1995 | Wilson | |
| 5,392,025 | A | 2/1995 | Figh et al. | |
| 5,429,399 | A | 7/1995 | Geringer et al. | |
| 5,474,342 | A | 12/1995 | Smith et al. | |
| 5,712,626 | A | 1/1998 | Andreou et al. | |
| 5,715,712 | A | 2/1998 | West | |
| 5,729,198 | A | 3/1998 | Gorman | |
| 5,799,518 | A | 9/1998 | Du | |
| 5,920,268 | A | 7/1999 | Bucci et al. | |
| 5,926,106 | A | 7/1999 | Beran et al. | |
| 5,933,086 | A | 8/1999 | Tischendorf et al. | |
| 5,936,544 | A | 8/1999 | Gonzales et al. | |
| 5,943,888 | A | 8/1999 | Lawson | |
| 5,987,818 | A | 11/1999 | Dabideen | |
| 5,996,383 | A | 12/1999 | Adelmeyer et al. | |
| 6,005,306 | A | 12/1999 | Pickard | |
| 6,022,056 | A * | 2/2000 | Cope | E05B 17/22 292/341.15 |
| 6,034,617 | A | 3/2000 | Luebke et al. | |
| 6,112,563 | A | 9/2000 | Ramos | |
| 6,128,933 | A | 10/2000 | Mirshafiee et al. | |
| 6,271,751 | B1 | 8/2001 | Hunt et al. | |
| 6,297,725 | B1 | 10/2001 | Tischendorf et al. | |
| 6,323,782 | B1 | 11/2001 | Stephens et al. | |
| 6,351,678 | B1 * | 2/2002 | Borders | A61G 13/12 700/83 |
| 6,360,621 | B1 | 3/2002 | Eldred et al. | |
| 6,486,793 | B1 | 11/2002 | Buccola | |
| 6,560,492 | B2 * | 5/2003 | Borders | A61G 13/08 700/83 |
| 6,725,127 | B2 | 4/2004 | Stevens | |
| 6,843,084 | B2 | 1/2005 | Porter | |
| 6,886,380 | B2 | 5/2005 | Kato et al. | |
| 6,957,767 | B2 | 10/2005 | Aupperle et al. | |
| 6,967,562 | B2 | 11/2005 | Menard et al. | |
| 6,976,919 | B2 | 12/2005 | Cole | |
| 7,023,319 | B2 | 4/2006 | Hwang | |
| RE39,144 | E | 6/2006 | Pickard | |
| 7,113,070 | B2 | 9/2006 | Deng et al. | |
| 7,165,428 | B2 | 1/2007 | Isaacs et al. | |
| 7,220,814 | B2 | 5/2007 | Rische et al. | |
| 7,239,238 | B2 | 7/2007 | Tester et al. | |
| 7,248,836 | B2 | 7/2007 | Taylor | |
| 7,249,705 | B2 | 7/2007 | Dudley | |
| 7,289,764 | B2 | 10/2007 | Gonzales et al. | |
| 7,296,448 | B1 | 11/2007 | Shaw | |
| 7,304,572 | B2 | 12/2007 | Sheynman et al. | |
| 7,334,443 | B2 | 2/2008 | Meekma et al. | |
| 7,346,331 | B2 | 3/2008 | Taylor et al. | |
| 7,346,439 | B2 | 3/2008 | Bodin | |
| 7,378,939 | B2 | 5/2008 | Sengupta et al. | |
| 7,389,661 | B2 | 6/2008 | Viviano et al. | |
| 7,391,319 | B1 | 6/2008 | Walker | |
| 7,446,644 | B2 | 11/2008 | Schaffzin et al. | |
| 7,471,191 | B2 | 12/2008 | Le Gars | |
| 7,481,471 | B2 | 1/2009 | Andersen et al. | |
| 7,624,280 | B2 | 11/2009 | Oskari | |
| 7,696,878 | B2 | 4/2010 | Cable et al. | |
| 7,701,331 | B2 | 4/2010 | Tran | |
| 7,747,286 | B2 | 6/2010 | Conforti | |
| 7,828,345 | B2 | 11/2010 | Terry et al. | |
| 7,828,346 | B2 | 11/2010 | Terry et al. | |
| 7,845,201 | B2 | 12/2010 | Meyerle et al. | |
| 7,849,721 | B2 | 12/2010 | Bass et al. | |
| 7,908,896 | B1 | 3/2011 | Olson et al. | |
| 7,952,477 | B2 | 5/2011 | Fogg | |
| 7,967,459 | B2 | 6/2011 | Schluep et al. | |
| 7,973,657 | B2 | 7/2011 | Ayed | |
| 7,994,925 | B2 | 8/2011 | Lahiri | |
| 7,999,656 | B2 | 8/2011 | Fisher | |
| 8,002,180 | B2 | 8/2011 | Harper et al. | |
| 8,011,217 | B2 | 9/2011 | Marschalek et al. | |
| 8,026,792 | B2 | 9/2011 | Powers et al. | |
| 8,026,816 | B2 | 9/2011 | Chao Cheng | |
| 8,035,478 | B2 | 10/2011 | Lee | |
| 8,035,479 | B2 | 10/2011 | Tran | |
| 8,069,693 | B2 | 12/2011 | Powers et al. | |
| 8,074,481 | B2 | 12/2011 | Bass et al. | |
| 8,079,240 | B2 | 12/2011 | Brown et al. | |
| 8,093,986 | B2 | 1/2012 | Harvey | |
| 8,106,752 | B2 | 1/2012 | Golden | |
| 8,115,609 | B2 | 2/2012 | Ketari | |
| 8,240,085 | B2 | 8/2012 | Hill | |
| 8,264,329 | B2 | 9/2012 | Roberts et al. | |
| 8,272,241 | B2 | 9/2012 | Brown et al. | |
| 8,292,337 | B2 | 10/2012 | Chang | |
| 8,347,659 | B2 | 1/2013 | Powers et al. | |
| 8,358,197 | B2 | 1/2013 | Tran | |
| 8,358,198 | B2 | 1/2013 | Harper et al. | |
| 8,360,307 | B2 | 1/2013 | Rudduck et al. | |
| 8,555,684 | B1 | 10/2013 | Chen | |
| 8,643,469 | B2 | 2/2014 | Haberli | |
| 8,683,833 | B2 | 4/2014 | Marschalek et al. | |
| 8,692,650 | B2 | 4/2014 | Pollabauer | |
| 8,701,353 | B2 | 4/2014 | Patel et al. | |
| 8,925,982 | B2 | 1/2015 | Bliding et al. | |
| 9,024,759 | B2 * | 5/2015 | Uyeda | E05B 47/026 340/542 |
| 9,085,919 | B2 | 7/2015 | Bacon | |
| 9,151,096 | B2 | 10/2015 | Hunt et al. | |
| 9,322,194 | B2 | 4/2016 | Cheng et al. | |
| 9,340,999 | B2 | 5/2016 | Romero | |
| 9,359,794 | B2 | 6/2016 | Cheng | |
| 9,382,739 | B1 | 7/2016 | Johnson et al. | |
| 9,424,700 | B2 | 8/2016 | Lovett et al. | |
| 9,447,604 | B2 | 9/2016 | Witte et al. | |
| 9,528,294 | B2 | 12/2016 | Johnson et al. | |
| 9,530,262 | B2 | 12/2016 | Johnson | |
| 9,546,504 | B2 | 1/2017 | Overgaard | |
| 9,574,372 | B2 | 2/2017 | Johnson et al. | |

(56) References Cited

U.S. PATENT DOCUMENTS 9,725,927 B1 8/2017 Cheng
9,758,991 B2 9/2017 Lin et al.
10,017,963 B2 7/2018 Johnson et al.
10,024,081 B2 7/2018 Li et al.
10,037,636 B2 7/2018 Ho et al.
10,738,504 B2 * 8/2020 Uyeda ..................... E05B 17/10
11,408,201 B2 * 8/2022 Uyeda ..................... E05B 17/10
11,408,202 B2 8/2022 Uyeda et al.
11,913,252 B2 * 2/2024 Uyeda ................ G07C 9/00944
2001/0045803 A1 11/2001 Cencur
2002/0109582 A1 8/2002 Mooney et al.
2002/0111701 A1 * 8/2002 Borders ............... A61G 13/107 700/60
2002/0140542 A1 10/2002 Prokoski et al.
2003/0084691 A1 5/2003 Kato et al.
2003/0114206 A1 6/2003 Timothy et al.
2003/0184437 A1 * 10/2003 Maloney ............ G08B 13/2431 340/568.1
2003/0230124 A1 12/2003 Johnson et al.
2004/0011094 A1 1/2004 Hsieh
2004/0035160 A1 2/2004 Meekma et al.
2004/0183652 A1 9/2004 Deng et al.
2004/0257209 A1 12/2004 Yang
2005/0035848 A1 2/2005 Syed et al.
2005/0046545 A1 3/2005 Skekloff et al.
2005/0116480 A1 6/2005 Deng et al.
2005/0204787 A1 9/2005 Ernst et al.
2005/0237166 A1 10/2005 Chen
2005/0279823 A1 12/2005 Mitchell
2006/0000247 A1 1/2006 Moon et al.
2006/0001522 A1 1/2006 Moon et al.
2006/0022794 A1 2/2006 Determan et al.
2006/0087125 A1 4/2006 Moon et al.
2006/0092378 A1 5/2006 Marsden et al.
2006/0103545 A1 5/2006 Tsou
2006/0113368 A1 6/2006 Dudley
2006/0114099 A1 6/2006 Deng et al.
2006/0226948 A1 10/2006 Wright et al.
2006/0266089 A1 11/2006 Dimig
2006/0273879 A1 12/2006 Pudelko et al.
2006/0283219 A1 12/2006 Bendz et al.
2007/0044524 A1 3/2007 Coutermarsh et al.
2007/0083921 A1 4/2007 Parris et al.
2007/0090921 A1 4/2007 Fisher
2007/0115094 A1 5/2007 Gillert et al.
2007/0126562 A1 6/2007 Ku
2007/0163863 A1 7/2007 Mitchell et al.
2007/0176739 A1 8/2007 Raheman
2007/0180869 A1 8/2007 Geyer
2007/0204663 A1 9/2007 Lee
2007/0214848 A1 9/2007 Meyerle et al.
2007/0226142 A1 9/2007 Hanna et al.
2007/0257773 A1 11/2007 Hill et al.
2007/0290793 A1 12/2007 Tran
2007/0290860 A1 12/2007 Lucas et al.
2008/0061927 A1 3/2008 Manton
2008/0129059 A1 6/2008 Chang
2008/0134732 A1 6/2008 Petersen
2008/0141330 A1 6/2008 Charles et al.
2008/0186171 A1 8/2008 Gates
2008/0196457 A1 8/2008 Goldman
2008/0250716 A1 10/2008 Ranaudo et al.
2008/0252414 A1 10/2008 Crigger et al.
2008/0278335 A1 11/2008 Welte
2008/0289383 A1 11/2008 Levine
2008/0303630 A1 12/2008 Martinez
2008/0314097 A1 12/2008 Rohlfing et al.
2009/0077217 A1 3/2009 McFarland et al.
2009/0108596 A1 4/2009 Terry et al.
2009/0135015 A1 5/2009 Dobson et al.
2009/0151410 A1 6/2009 Hapke
2009/0173119 A1 7/2009 Hunt et al.
2009/0183541 A1 7/2009 Sadighi et al.
2009/0201127 A1 8/2009 Stobbe et al.
2009/0211319 A1 8/2009 McCormack
2009/0223265 A1 9/2009 Chang
2009/0231132 A1 9/2009 Shoenfel
2009/0249846 A1 10/2009 Gokcebay
2009/0256677 A1 10/2009 Hein et al.
2009/0273440 A1 11/2009 Marschalek et al.
2009/0280862 A1 11/2009 Loughlin et al.
2009/0293561 A1 12/2009 Jakobsen et al.
2009/0308116 A1 12/2009 Lambrou
2009/0320538 A1 12/2009 Pellaton
2010/0031713 A1 2/2010 Brown et al.
2010/0031714 A1 2/2010 Brown et al.
2010/0066507 A1 3/2010 Myllymaki
2010/0102927 A1 4/2010 Monig
2010/0126071 A1 5/2010 Hill
2010/0201536 A1 8/2010 Robertson et al.
2010/0218569 A1 9/2010 Hunt et al.
2010/0225123 A1 9/2010 Chiang et al.
2010/0259387 A1 10/2010 Jiang
2010/0300163 A1 12/2010 Loughlin et al.
2010/0307206 A1 12/2010 Taylor et al.
2010/0326146 A1 12/2010 Powers et al.
2010/0328089 A1 12/2010 Eichenstein et al.
2011/0005282 A1 1/2011 Powers et al.
2011/0056253 A1 3/2011 Greiner et al.
2011/0067308 A1 3/2011 Hunt et al.
2011/0067464 A1 3/2011 Chiou et al.
2011/0084856 A1 4/2011 Kleindienst et al.
2011/0088086 A1 4/2011 Swink et al.
2011/0128143 A1 6/2011 Daniel
2011/0148631 A1 6/2011 Lanham et al.
2011/0185779 A1 8/2011 Crass et al.
2011/0203331 A1 8/2011 Picard et al.
2011/0204656 A1 8/2011 Lai
2011/0252843 A1 10/2011 Sumcad et al.
2011/0255250 A1 10/2011 Dinh et al.
2011/0259059 A1 10/2011 Wu et al.
2011/0265527 A1 11/2011 Saari
2011/0265528 A1 11/2011 Saari
2011/0283755 A1 11/2011 Chen
2011/0291798 A1 12/2011 Schibuk
2012/0011907 A1 1/2012 Sprenger et al.
2012/0031153 A1 2/2012 Conti
2012/0032775 A1 2/2012 Kikuchi
2012/0086569 A1 4/2012 Golden
2012/0096909 A1 4/2012 Hart et al.
2012/0119877 A1 5/2012 Ng et al.
2012/0154115 A1 6/2012 Herrala
2012/0167646 A1 7/2012 Sharma et al.
2012/0169453 A1 7/2012 Bryla et al.
2012/0186308 A1 7/2012 Garthe
2012/0222103 A1 8/2012 Bliding et al.
2012/0227450 A1 9/2012 Ufkes
2012/0229251 A1 9/2012 Ufkes
2012/0234058 A1 9/2012 Neil et al.
2012/0280789 A1 11/2012 Gerhardt et al.
2012/0293655 A1 11/2012 Loughlin et al.
2012/0306617 A1 12/2012 Tung
2012/0309364 A1 12/2012 Quady
2012/0324968 A1 12/2012 Goren et al.
2013/0008213 A1 1/2013 Brown et al.
2013/0014549 A1 1/2013 Cavanaugh
2013/0027180 A1 1/2013 Lakamraju et al.
2013/0049382 A1 2/2013 Day et al.
2013/0086956 A1 4/2013 Nave
2013/0181935 A1 * 7/2013 Mckenzie ............. G06F 3/0445 345/174
2014/0078086 A1 3/2014 Bledsoe et al.
2014/0157842 A1 6/2014 Almomani et al.
2014/0250956 A1 * 9/2014 Chong ............... G07C 9/00944 70/278.1
2014/0260448 A1 9/2014 Beck et al.
2014/0300116 A1 10/2014 Hellwig et al.
2015/0159411 A1 6/2015 Son et al.
2015/0269799 A1 9/2015 Martinez et al.
2016/0032621 A1 2/2016 Johnson et al.
2016/0047145 A1 2/2016 Johnson et al.
2016/0307380 A1 10/2016 Ho et al.
2016/0319569 A1 11/2016 Johnson et al.
2016/0326773 A1 11/2016 Tobias et al.

(56) References Cited

U.S. PATENT DOCUMENTS

| | | | |
|---|---|---|---|
| 2017/0018956 | A1 | 1/2017 | Geiszler |
| 2017/0114577 | A1 | 4/2017 | Beshke, Sr. et al. |
| 2017/0204636 | A1 | 7/2017 | Sack |
| 2017/0284131 | A1 | 10/2017 | Lin et al. |
| 2017/0301166 | A1 | 10/2017 | Earles et al. |
| 2017/0306648 | A1 | 10/2017 | Ramsauer et al. |
| 2017/0352216 | A1 | 12/2017 | Donovan |
| 2017/0358160 | A1 | 12/2017 | Gardiner et al. |
| 2018/0073274 | A1 | 3/2018 | Johnson et al. |
| 2018/0108192 | A1 | 4/2018 | Ho et al. |
| 2018/0135336 | A1 | 5/2018 | Johnson et al. |
| 2018/0135337 | A1 | 5/2018 | Johnson et al. |
| 2018/0171660 | A1 | 6/2018 | Snider |
| 2018/0179786 | A1 | 6/2018 | Johnson |
| 2021/0040773 | A1 | 2/2021 | Uyeda et al. |
| 2021/0156171 | A1 | 5/2021 | Uyeda et al. |

FOREIGN PATENT DOCUMENTS

| | | |
|---|---|---|
| CN | 1947158 | 4/2007 |
| CN | 101046129 | 10/2007 |
| CN | 201351381 | 11/2009 |
| CN | 202450862 | 9/2012 |
| CN | 102747893 | 10/2012 |
| CN | 202596325 | 12/2012 |
| EP | 0 730 073 | 9/1996 |
| EP | 1 710 753 | 10/2006 |
| GB | 2227052 | 7/1990 |
| JP | 2005-146816 | 6/2005 |
| JP | 2008-31778 | 2/2008 |
| JP | 2008-190224 | 8/2008 |
| JP | 4279438 | 3/2009 |
| JP | 2011-17122 | 1/2011 |
| JP | 2011-63991 | 3/2011 |
| KR | 10-2011-0011312 | 2/2011 |
| WO | 93/09319 | 5/1993 |
| WO | 2011/109005 | 9/2011 |

OTHER PUBLICATIONS

International Search Report and Written Opinion for Application No. PCT/US2014/022482 mailed Sep. 29, 2014.

International App. No. PCT/US2014/022482, International Preliminary Report on Patentability; Sep. 24, 2015.

Website entitled “Benefits of SmartCode Lever”, Kwikset, https://web.archive.org/web/20130305055014/https://www.kwikset.com/smartsecurity/electronic-locks/electronic-lever.aspx>, 2 pages (Mar. 5, 2013).

Website Material on Touch Sensor (Oct. 20, 2010); entitled: “AC Type 8 Disabled Persons Toilet System”; http://www.autodoorsprings.co.uk/disabled_persons_toilet_system.html.

Youtube Video entitled SoundWavesAmerica, Control 4 Kwikset SmartCode with Home Connect Technology, https://www.youtube.com/watch?v=VIIjK_q9Lxw>, 2 pages (Nov. 9, 2011).

* cited by examiner

WIRELESS LOCKSET WITH TOUCH ACTIVATION

RELATED APPLICATIONS

This application is a continuation of U.S. application Ser. No. 17/817,703, filed Aug. 5, 2022, now U.S. Pat. No. 11,913,252; which is a continuation of U.S. application Ser. No. 16/987,053, filed Aug. 6, 2020, now U.S. Pat. No. 11,408,201; which is a continuation of U.S. application Ser. No. 14/689,766, filed Apr. 17, 2015, now U.S. Pat. No. 10,738,504; which is a continuation of U.S. application Ser. No. 14/202,047, filed Mar. 10, 2014, now U.S. Pat. No. 9,024,759; which claims the benefit of U.S. Provisional Application Ser. No. 61/792,896, filed Mar. 15, 2013. These applications are hereby expressly incorporated by reference in their entirety into the present application.

TECHNICAL FIELD

This disclosure relates generally to electro-mechanical locks.

BACKGROUND AND SUMMARY

Electronic locks have gained increasing acceptance and widespread use in residential and commercial markets. These locksets control ingress through doors in a building by requiring certain electronic credentials. For example, these locksets typically include a control circuit that determines whether to unlock the lockset based on credentials provided by the user. In some cases, for example, the credentials and/or commands may be provided wirelessly to the lockset, such as disclosed in Pre-Grant Publication No. US 2012/0234058 for a “Wireless Access Control System and Related Methods,” filed Mar. 8, 2012, which is hereby incorporated by reference.

In the access control and security industries, wireless locksets typically include an antenna located on the interior side of the door, usually behind a plastic “RF window” to not interfere with the RF propagation. Some locksets attempt to place an antenna on the exterior side of the door, but must deal with the challenge of making the antenna aesthetically appealing, RF communication efficient, tamper resistant, and easy to manufacture.

According to one aspect, this disclosure provides a wireless electromechanical lock with one or more of an internal antenna, touch activation, and/or a light communication device that acts as a user interface. Although this disclosure describes these features as implemented on a deadbolt for purposes of example, these features are applicable to any type of lockset, including but not limited to deadbolts, knobset locks, handleset locks, etc.

In one embodiment, the lock is made of mixed metals and plastic, with engineered cavities to contain electronics and RF antennas. For example, in some embodiments, the lock utilizes an antenna near the exterior face of the lockset, designed inside the metal body of the lockset itself. This is unique in that the metal body has been engineered to meet strict physical security requirements and also allow the embedded front-facing antenna to propagate RF energy efficiently. This holds many advantages over other means of antenna placement including compact size, cleaner aesthetic appearance, simplistic manufacturing, and tamper resistance.

A light communication device is provided in some embodiments to communicate information, visually, to the user via animations and dynamic displays of light. For example, a light communication device could be formed in a ring-shape in some embodiments that is incorporated into the exterior of the lock. In some cases, the light communication device can be used to selectively illuminate regions to create animations of dynamic multi-color light and configurations of static light along the circumference of the exterior light ring to communicate multiple user messages. These animations allow mimicking of lock operation to be possible. For example, animations may include, but are not limited to, sequentially illuminating light segments to show the direction of bolt movement or slow animation of light to indicate the lockset is busy, etc. Embodiments are contemplated in which the light communication device could be formed in shapes other than circular for a ring, such as rectangular, square, triangular, etc.

In some cases, the lockset includes a touch activation capability, which can be used to lock/unlock the lock and/or otherwise provide input. In some embodiments, for example, the entire outside cover of the lock is touch sensitive and allows a user to touch the lock to activate various functions of the lockset. This capability is unique because it does not require any special keypad area, button press, or glass capacitive touch sensor area, but rather allows the entire diameter of the lockset cover to act as a capacitive touch sensor for activation.

According to a further aspect, this disclosure provides a lockset with a latch assembly including a bolt movable between an extended position and a retracted position. The lockset has a controller configured to electronically control movement of the bolt between the extended position and the retracted position. An interior assembly is provided that includes a turn piece for manually actuating the bolt between the extended position and the retracted position. The lockset has an exterior assembly including a mechanical lock assembly configured to manually actuate the bolt between the extended position and the retracted position. The exterior assembly includes a light communication device with a plurality of independently controllable regions in electrical communication with the controller. In some embodiments, the controller is configured to actuate multiple of the regions in a predefined configuration to identify a condition of the lockset.

Depending on the circumstances, the controller could be configured to actuate the predefined configuration by adjusting (a) illumination of multiple regions of the light communication device, (b) intensity of multiple regions of the light communication device, and/or (c) color of multiple regions of the light communication device. In some embodiments, the controller is configured to actuate the predefined configuration by sequentially adjusting adjacent regions of the light communication device in illumination, intensity, and/or color.

In some embodiments, the light communication device includes at least three regions that are configured to sequentially adjust in illumination, intensity, and/or color. For example, the controller could be configured to sequentially adjust adjacent regions in a first order to identify a first condition of the lockset. Likewise, the controller could be configured to sequentially adjust adjacent regions in a second order, which is opposite of the first order, to identify a second condition of the lockset. For example, the orders in which adjustments are made could indicate the direction of the bolt.

Embodiments are contemplated in which at least a portion of the regions of the light communication device are arranged in a ring-like shape. In some cases, for example, the controller could be configured to sequentially adjust adjacent regions in a generally clockwise fashion to indicate movement of the bolt in a first direction. The movement of the bolt in the opposition direction could be indicated with a counter-clockwise actuation of the regions. In some embodiments, the exterior assembly includes a cylinder guard cover having a generally frustoconical shape. In some cases, the light communication device is generally concentric to a frustum of the cylinder guard cover.

According to yet another embodiment, this disclosure provides a lockset with a latch assembly including a bolt movable between an extended position and a retracted position. A controller is provided to electronically control movement of the bolt between the extended position and the retracted position. The lockset includes an interior assembly including a turn piece for manually actuating the bolt between the extended position and the retracted position. An exterior assembly is provided with a mechanical lock assembly configured to manually actuate the bolt between the extended position and the retracted position. The exterior assembly includes a touch surface. The controller is configured to actuate movement of the bolt between the extended position and the retracted position responsive to capacitive touch sensing of the touch surface.

In some embodiments, the exterior assembly includes a cylinder guard cover extending from the mechanical lock assembly and the touch surface comprises an external surface of the cylinder guard cover. For example, in some cases, the touch surface comprises substantially the entire external surface of the cylinder guard cover. Embodiments are contemplated in which the cylinder guard cover has a generally frustoconical shape. For example, the touch surface could include substantially an entire side wall of the cylinder guard cover.

According to a further aspect, this disclosure provides a lockset with a locking device movable between a locked position and an unlocked position. The locking device includes a cylinder guard cover, a handle, and/or a rose. A touch surface is formed as part of the lockset. An electrical circuit is provided that is configured to identify touching of the touch surface. In some embodiments, an insulator separates the touch surface and the electrical circuit. A conductive medium could be provided that electrically connects the touch surface and the electrical circuit.

According to yet another aspect, the disclosure provides a lockset with a latch assembly including a bolt movable between an extended position and a retracted position. The lockset includes a controller configured to electronically control movement of the bolt between the extended position and the retracted position. An antenna is in electrical communication with the controller. An interior assembly is provided that includes a turn piece for manually actuating the bolt between the extended position and the retracted position. An exterior assembly is also provided with a mechanical lock assembly with a cylinder configured to manually actuate the bolt between the extended position and the retracted position. The exterior assembly includes a cylinder guard surrounding the cylinder that is configured to structurally protect the cylinder. The cylinder guard defines an internal cavity in which the antenna is at least partially disposed. In some cases, the antenna is entirely disposed in the internal cavity.

In some embodiments, the cylinder guard has a front side and a rear side. The cavity has an open end on the front side of the cylinder guard. A front cover extends from the open end of the cavity that is generally coplanar with a front face of the cylinder. Typically, the front cover is formed from a generally RF transparent material. In some cases, a light communication device extends between the open end of the cavity and the front cover. In some such situations, the light communication device is formed from a generally RF transparent material.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which.

Figure 1:
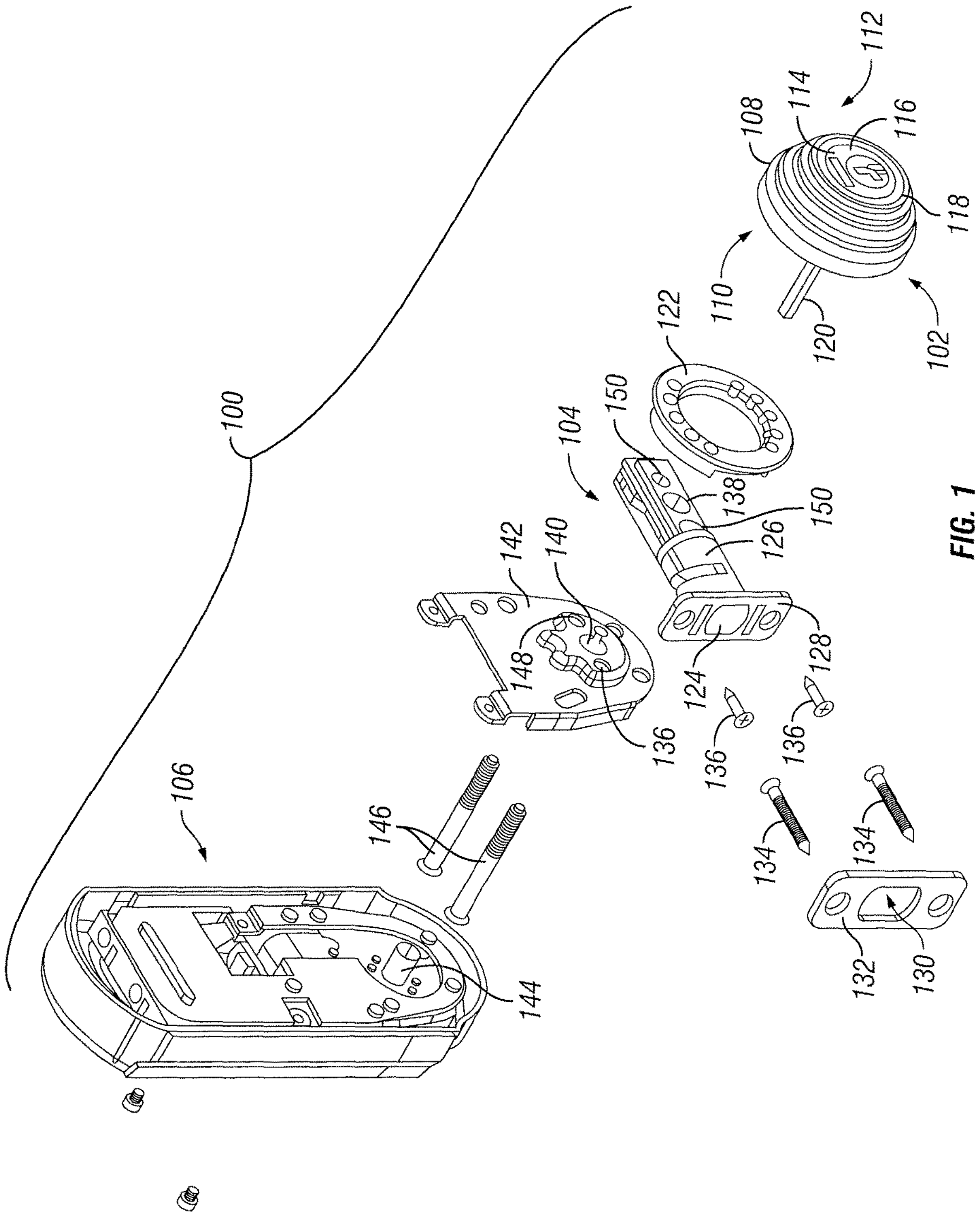
FIG. 1 is an exploded view of an example lock assembly according to one embodiment of the disclosure.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This disclosure generally relates to an electromechanical lock with certain features. The term "electronic lock" is broadly intended to include any type of lockset that uses electrical power in some manner, including but not limited to electronic deadbolts, electronic lever sets, etc. This disclosure encompasses the integration of one or more of features described herein into any type of electronic lock and is not intended to be limited to any particular type of electronic lock.

FIG. 1 shows an example lock assembly 100 according to one embodiment of the disclosure. In the example shown, the lock assembly 100 includes an exterior assembly 102, a latch assembly 104, and an interior assembly 106. Typically, the exterior assembly 102 is mounted on the outside of a door, while the interior assembly 106 is mounted inside a door. The latch assembly 104 is typically mounted in a bore formed in the door. The term "outside" is broadly used to mean an area outside a door and "inside" is broadly used to denote an area inside a door. With an exterior entry door, for example, the exterior assembly 102 may be mounted outside a building, while the interior assembly 106 may be mounted inside a building. With an interior door, the exterior assembly may be mounted inside a building, but outside a room secured by the lock assembly 100; the interior assembly 106 may be mounted inside the secured room. The lock assembly 100 is applicable to both interior and exterior doors.

In the example shown, the exterior assembly 102 is in the form of a deadbolt. As discussed above, however, this disclosure is not intended to be limited to only an electronic deadbolt, but encompasses any kind of electronic lock. As shown, the exterior assembly 102 includes a cylinder guard cover 108 that houses internal components of the exterior assembly 102. In the example shown, the cylinder guard cover 108 has a decorative shape with a rear portion 110 that would be adjacent a door (not shown) and a front portion 112 extending from the door. In this example, the cylinder guard cover 108 has a tapered shape from the rear portion 110 to the front portion 112, but the exterior assembly 102 and cylinder guard cover 108 could have a wide variety of different sizes and shapes depending on the particular circumstances.

In the embodiment shown, the front portion 112 of the exterior assembly 102 includes a front cover 114 that surrounds a mechanical locking assembly 116. A mechanical key (not shown) may be inserted into the mechanical locking assembly 116 to mechanically unlock the lock assembly 100.

In the embodiment shown, a light communication device 118 surrounds the front cover 114. In this example, the light communication device 118 is formed in the shape of a ring surrounding the front cover 114 and mechanical locking assembly 116. However, the light communication device 118 could be formed in other shapes or positioned differently on the exterior assembly 102.

As explained further below, the light communication device 118 includes a plurality of regions that could be independently controlled to visually communicate messages to the user, including but not limited to, an action currently being processed by the lock assembly 100, information about the status of the lock assembly 100, and/or requests for user input. By way of example, the light communication device 118 could visually communicate the direction of bolt movement by illuminating regions in sequence to create a rotation animation showing a direction of movement. The light communication device 118 could visually communicate messages to the user by controlling various attributes of the regions, such as turning regions on/off, changing intensity of regions, changing colors illuminated by regions, or other manners of changing the illumination of the light communication device 118.

In some embodiments, the lock assembly 100 may be touch activated. For example, the lock assembly 100 may use capacitive sensing to determine whether the user wants to actuate the lock assembly 100. The touch surface for capacitive sensing to actuate the lock assembly 100 could be any external surface, including but not limited to, a cylinder guard cover, a cylinder guard, a keyway, a handle, a rose, or other exterior surface of the lock assembly 100. In the example shown, the exterior assembly 102 uses capacitive sensing to determine when a user touches the cylinder guard cover 108. Accordingly, in the embodiment shown, the user is able to touch anywhere on the cylinder guard cover 108 to lock or unlock the lock assembly 100, or otherwise activate various functions of the lock assembly 100.

In the example shown, the exterior lock assembly 102 has a torque blade 120 extending from the rear portion 110. The torque blade extends through an adaptor 122 in the embodiment shown, which is received within a bore in a door to which the lock assembly 100 is being installed or mounted.

The latch assembly 104 is disposed in a core in a door and may be actuated manually by the mechanical locking assembly 116, or electronically by touching anywhere on the cylinder guard cover 108 (in the embodiment shown) to extend/retract a bolt 124. The bolt 124 moves linearly in and out of a sleeve 126. When the bolt 124 is retracted, an end of the bolt 124 is generally flush with a base plate 128. When the bolt 124 is extended, the bolt 124 protrudes through an edge bore in the door into an opening 130 of a strike plate 132, which is positioned in a jamb adjacent the door. As is typical, the strike plate 132 is attached to the jamb using fasteners 134. Likewise, fasteners 136 attach the base plate 128 of the latch assembly 104 to the door.

In the embodiment shown, the latch assembly 104 includes a spindle 138 that is drivable in a first direction to extend the bolt 124 and a second direction to retract the bolt 124. The spindle 138 is configured to receive the torque blade 120 such that rotation of the torque blade 120 in a first direction retracts the bolt 124; whereas, rotation of the torque blade 120 in the opposite direction causes the spindle to retract the bolt 124.

The torque blade 120 extends through the latch assembly 104 into an opening 140 in a mounting plate 142, which is attached to an interior side of the door. The torque blade 120 passes through the opening 140 and is received by a spindle driver 144. The spindle driver 144 provides electronic control of the bolt 124, such as using a motor to rotate the spindle driver 144 in either a first direction or in a second direction. Since the torque blade 120 is disposed within the spindle 138, rotation of the spindle driver 144 may be used to extend and/or retract the bolt 124 of the latch assembly 104. In the embodiment shown, fasteners 146 extend through holes 148 in the mounting plate, which are aligned with openings 150 in the latch assembly 104. A wiring harness (not shown) electrically connects electronics between the exterior assembly 102 and the interior assembly 106.

Figure 2:
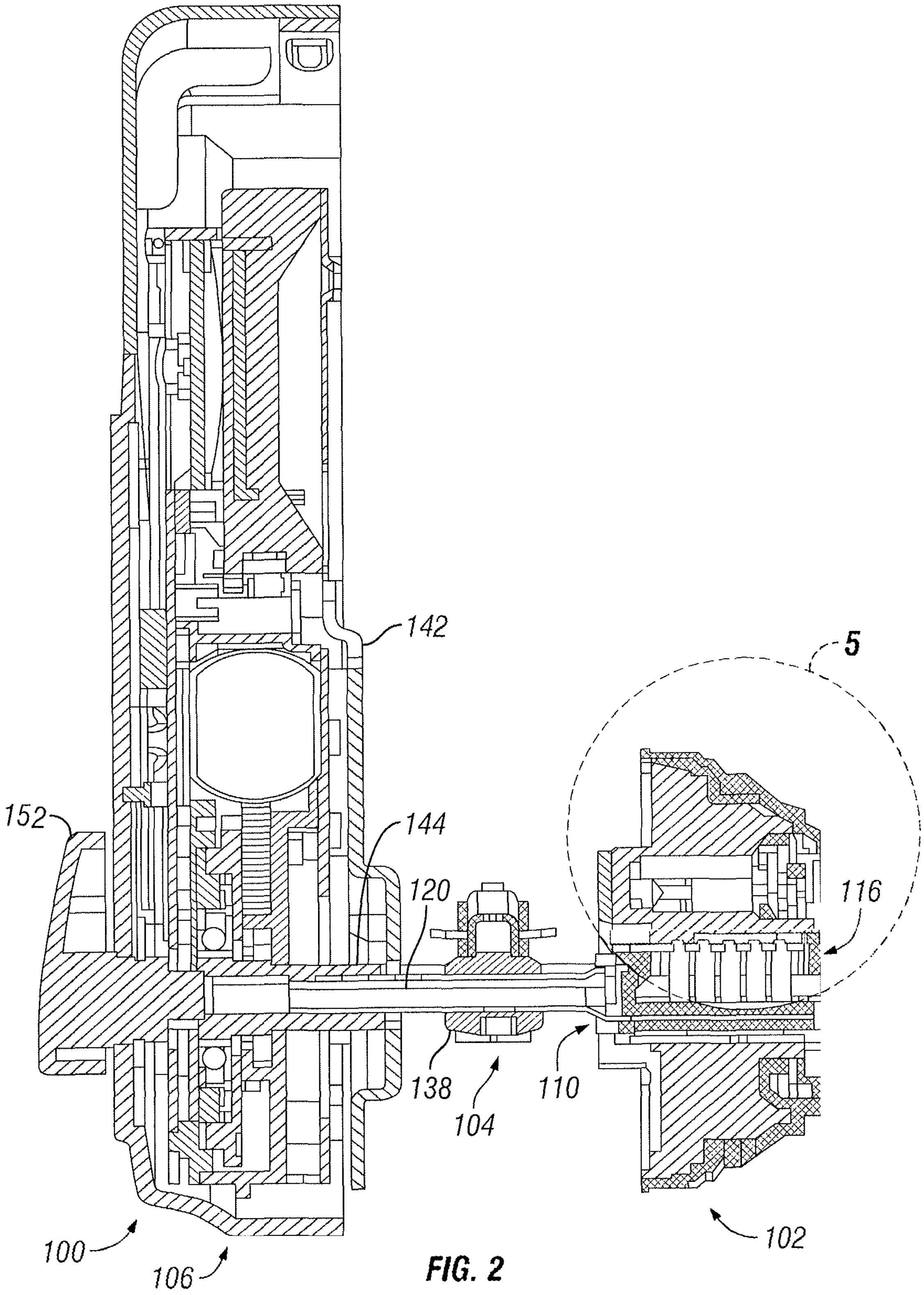
FIG. 2 is a side cross-sectional view of the example lock assembly shown in FIG. 1 in an assembled state.

FIG. 2 is a side cross-sectional view of the lock assembly 100 in an assembled state. In the example shown, the torque blade 120 can be seen extending from the rear portion 110 of the exterior assembly 102 through the spindle 138 of the latch assembly 104 into the spindle driver 144 of the interior assembly 106. The torque blade 120 may be driven to extend/retract the bolt 124 in several ways. For example, the mechanical locking assembly 116 could be actuated by a mechanical key to rotate the torque blade 120, which would allow the bolt 124 to be extended/retracted. The exterior assembly 102 could be used to electronically actuate the latch assembly 104 by touching anywhere on the cylinder guard cover 108 (assuming the lock assembly 100 received authenticated credentials prior to the user touching the cylinder guard cover 108). By touching anywhere on the exterior assembly 102 to actuate the bolt 124, a message is sent from the exterior assembly 102 to the interior assembly 106 using a wiring harness to actuate a motor in the interior assembly 106 that drives the torque blade 120 using the spindle driver 144. Additionally, if the user is inside the door, a turn piece 152 could be manually rotated by the user to actuate the torque blade 120 (via the spindle driver 144), thereby moving the bolt 124 between its extended and retracted positions.

Figure 3:
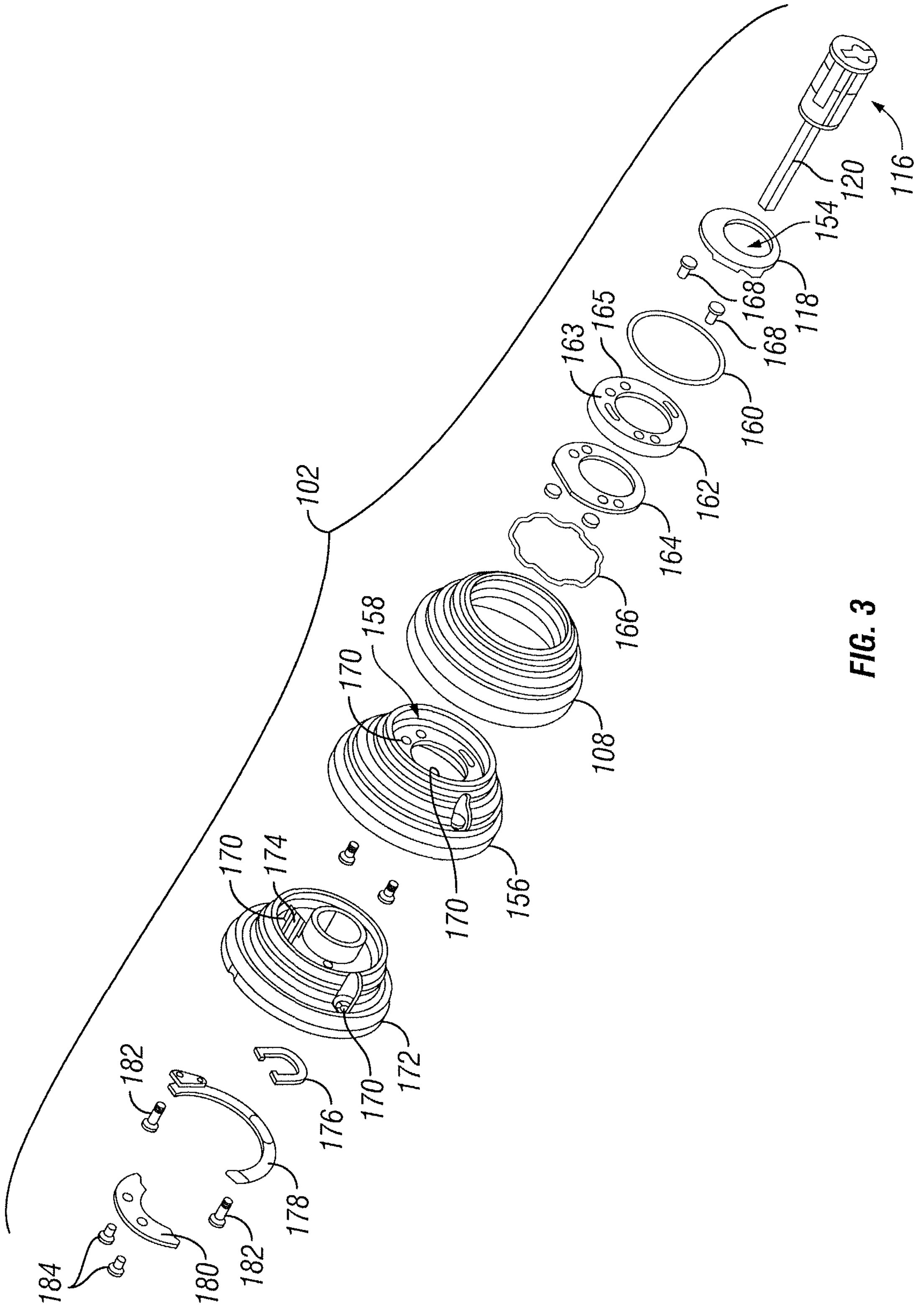
FIG. 3 is an exploded view of the example exterior assembly shown in FIGS. 1 and 2.

FIG. 3 is an exploded view of the exterior assembly 102. As shown, the mechanical locking assembly 116, which could be a pin-tumbler locking arrangement, has the torque blade 120 extending therefrom. As shown, the front end of the mechanical locking assembly 116 is received by an opening 154 in the front cover 114. Preferably, the front cover 114 is made of a RF transparent material, such as a plastic. By way of example only, the front cover 114 could be made of a material called Terluran GP-22 by BASF of Ludwigshafen, Germany or Polylac PA-727 by Chi Mei Corporation of Taiwan.

In the embodiment shown, referring also to FIGS. 7-11, the exterior assembly 102 includes an insulator 156 that is received within the rear portion 110 of the cylinder guard cover 108. The insulator 156 is formed from an electrical insulator material, such as Polycarbonate PC-110 by Chi Mei Corporation of Taiwan. In this example, the insulator 156 includes a recessed portion 158 that houses several internal components. In the example shown, an O-ring 160, a light pipe 162, a PCB board 164, and a conductive wave washer 166 are housed in the recessed portion 158 between the insulator 156 and the cylinder guard cover 108.

In the example shown, the light communication device 118 is a light pipe 162. As shown, referring also to FIGS. 19-24, the light pipe 162 includes a recessed portion 163 on the front end that is dimensioned to receive the front cover 114. A flange 165, which is a ring-shape in the embodiment shown, surrounding the front cover 114 can be selectively illuminated. Accordingly, in the embodiment shown, the flange 165 or ring surrounding the front cover 114 may light up during operation. As discussed above, for example, the light pipe 162 may include a plurality of regions that are independently controllable to visually display messages to the user, which could be animations in some embodiments. In some embodiments, the light pipe 162 is translucent or transparent. By way of example only, the light pipe 162 could be made from a product called Polycarbonate PC-110 by Chi Mei Corporation of Taiwan. As shown, the light pipe 162 includes a groove dimensioned to receive a seal, which is an O-ring 160 in this example. The O-ring prevents moisture from entering the front portion 112 of the exterior assembly 102. In the example shown, fasteners 168 extend through the light pipe 162, PCB board 164, and insulator 156 to connect within threaded openings 170 of a cylinder housing 172.

Referring also to FIGS. 12-18, the cylinder housing (also called cylinder guard) 172 provides impact strength and structural reinforcement for the exterior assembly 102. For example, the cylinder housing 172 may be formed from a zinc alloy in some embodiments. In the embodiment shown, the cylinder housing 172 is received in a rear portion of the insulator 156. As shown, the cylinder housing 172 includes a cavity 174 that is configured to receive an antenna. Despite having a cavity in the cylinder housing 172, the cylinder housing 172 provides sufficient reinforcement for the exterior assembly 102 in tests.

A clip 176 retains a rear portion of the mechanical locking assembly 116 within the exterior assembly 102. A retainer 178 and plate 180 are attached to a rear portion of the cylinder housing 172 for added tamper resistance and structural reinforcement of the cylinder housing 172. Fasteners 182, 184 are received within threaded openings in a back portion of the cylinder housing 172 to fasten the retainer 178 and plate 180.

Figure 4:
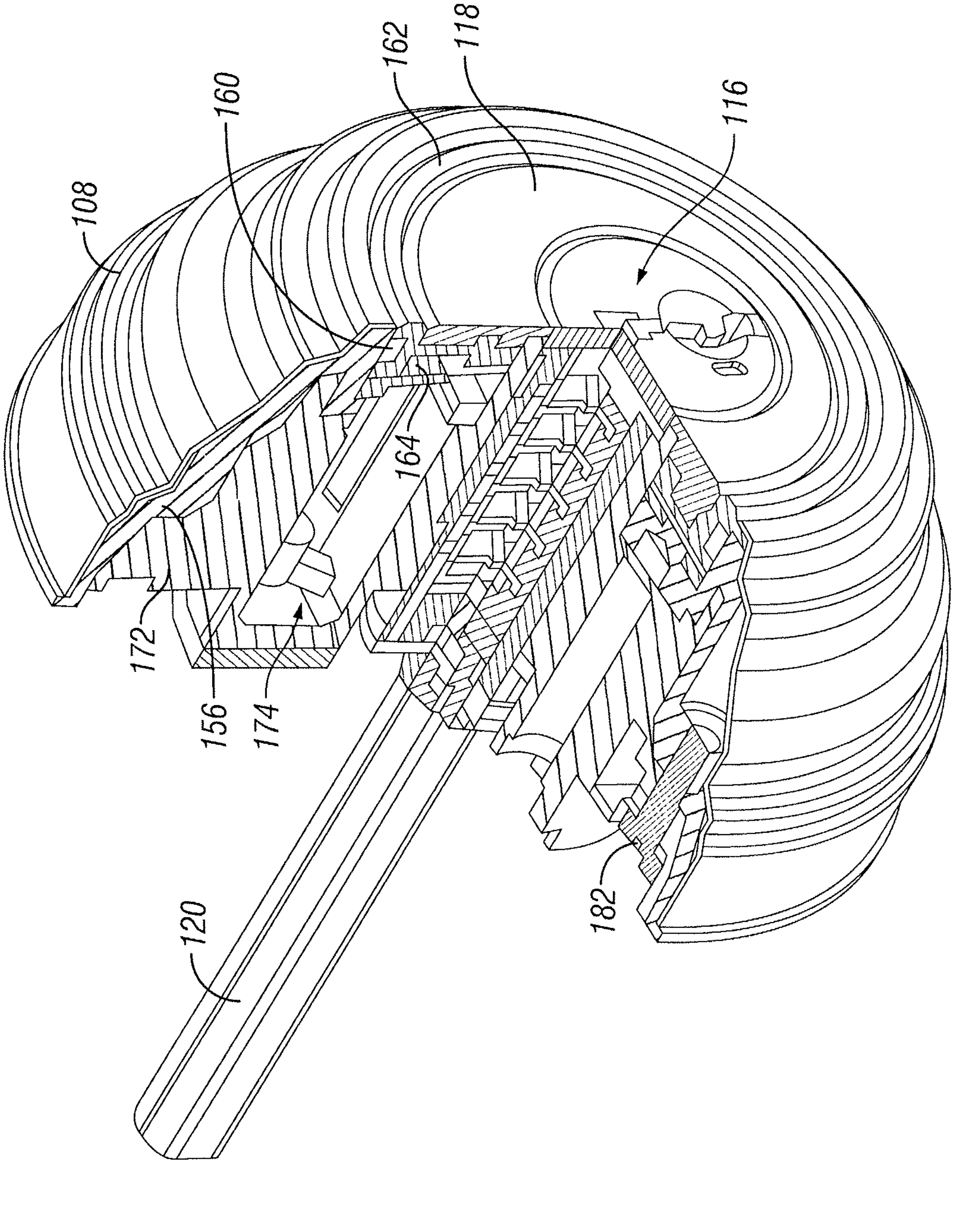
FIG. 4 is a front perspective view of the example exterior assembly shown in FIGS. 1 and 2 with a section removed to show interior components.

FIG. 4 is a front perspective view of the exterior assembly 102 with a portion removed to expose internal components. In this view, the cavity 174 formed in the cylinder housing 172 can be seen. This allows an antenna to be internal to the exterior assembly 102 (within the cylinder housing 172 as shown) to transmit signals outside the exterior assembly 102. With an antenna on the front portion of the exterior assembly 102, behind the light pipe 162 and front cover 114, which are both plastic, this allows wireless signals to be transmitted out of the exterior assembly 102. From this view, it can also be seen that the flange 165 of the light pipe 162 extends around the front cover 114, which can be used to communicate with the user.

Figure 5:
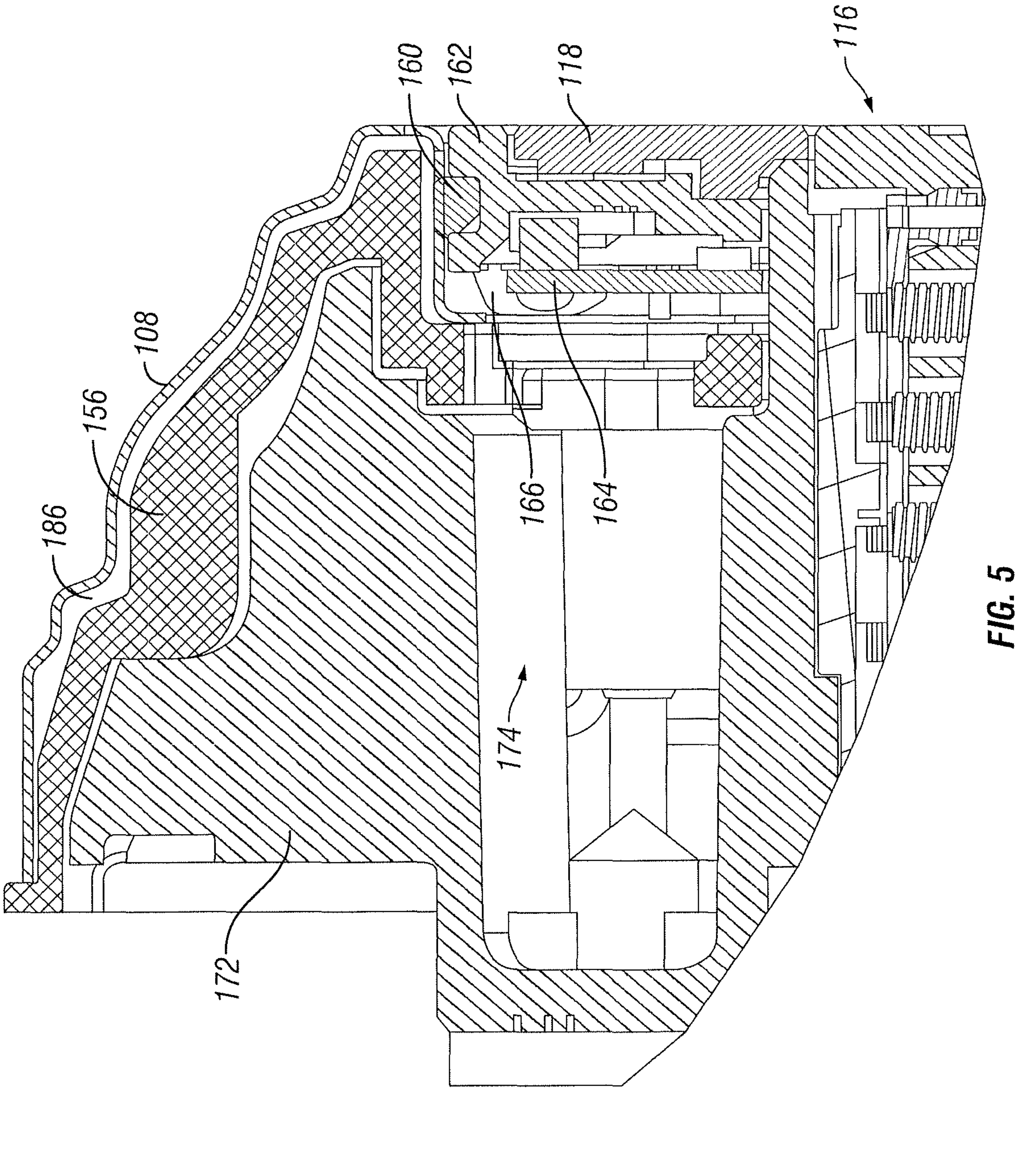
FIG. 5 is a partial side cross-sectional view of the example exterior assembly shown in FIGS. 1 and 2.
Figure 27:
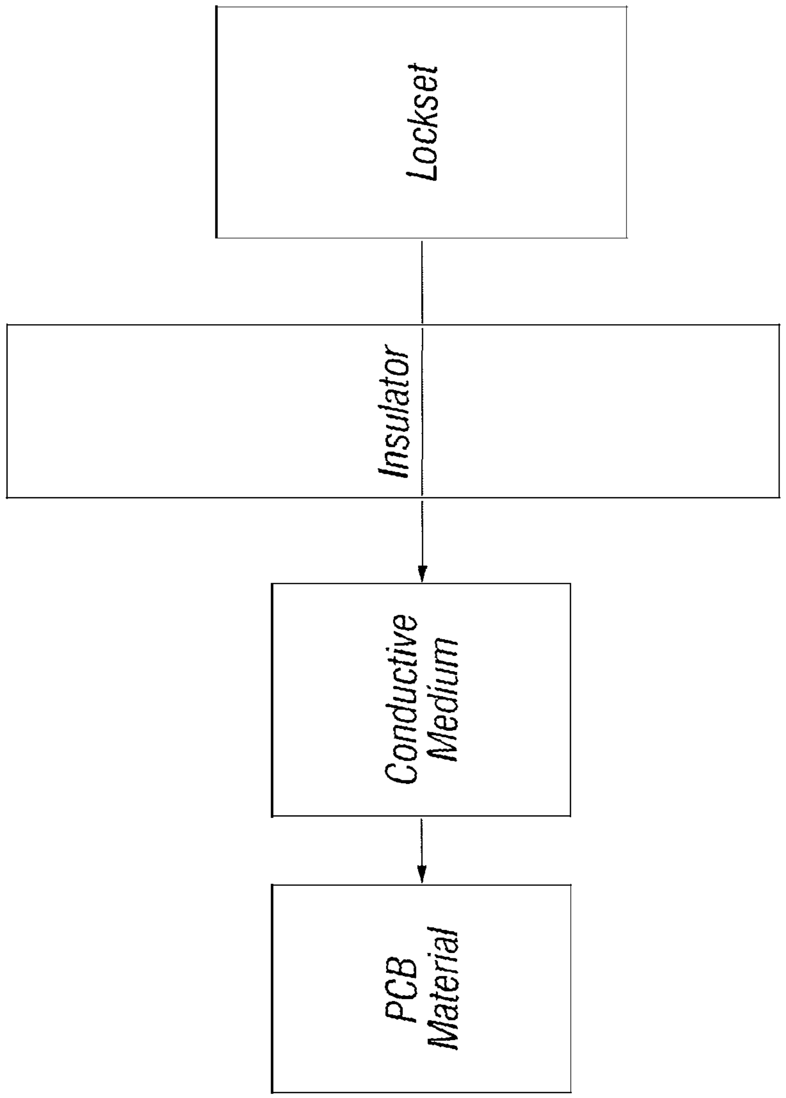
FIG. 27 is a diagrammatical view showing an electrical connection from the lockset to the PCB through capacitive sensing.

FIG. 5 is a side cross-sectional view of a portion of the exterior assembly 102. As shown, an air gap 186 is formed by the insulator 156 between the cylinder guard cover 108 and the cylinder housing 172. The insulator 156 also separates the touch surface, which is the cylinder guard cover 108 in this example, from the PCB 164 that hosts the touch electronics. In this example, the conductive wave washer 166 is compressed between the PCB 164 and the cylinder guard cover 108 to make electrical contact. With this electrical connector, the PCB 164 can sense when a user touches anywhere on the cylinder guard cover 108. Although the cylinder guard cover 108 is shown for purposes of example, the touch surface could be any mechanical feature of a lockset, including but not limited to, a cylinder guard cover, cylinder guard, cylinder, keyway, handle, rose, or other exterior/interior features of a lockset. Although the conductive wave washer 166 is shown for purposes of example, the conductive medium could be a conductive foam, conductive tape, conductive grease, or any other mechanical device electrically connecting the touch surface of the lockset to the PCB that hosts the touch electronics. This is shown diagrammatically in FIG. 27. Also visible from the view is the cavity 174 for housing the antenna.

Figure 6:
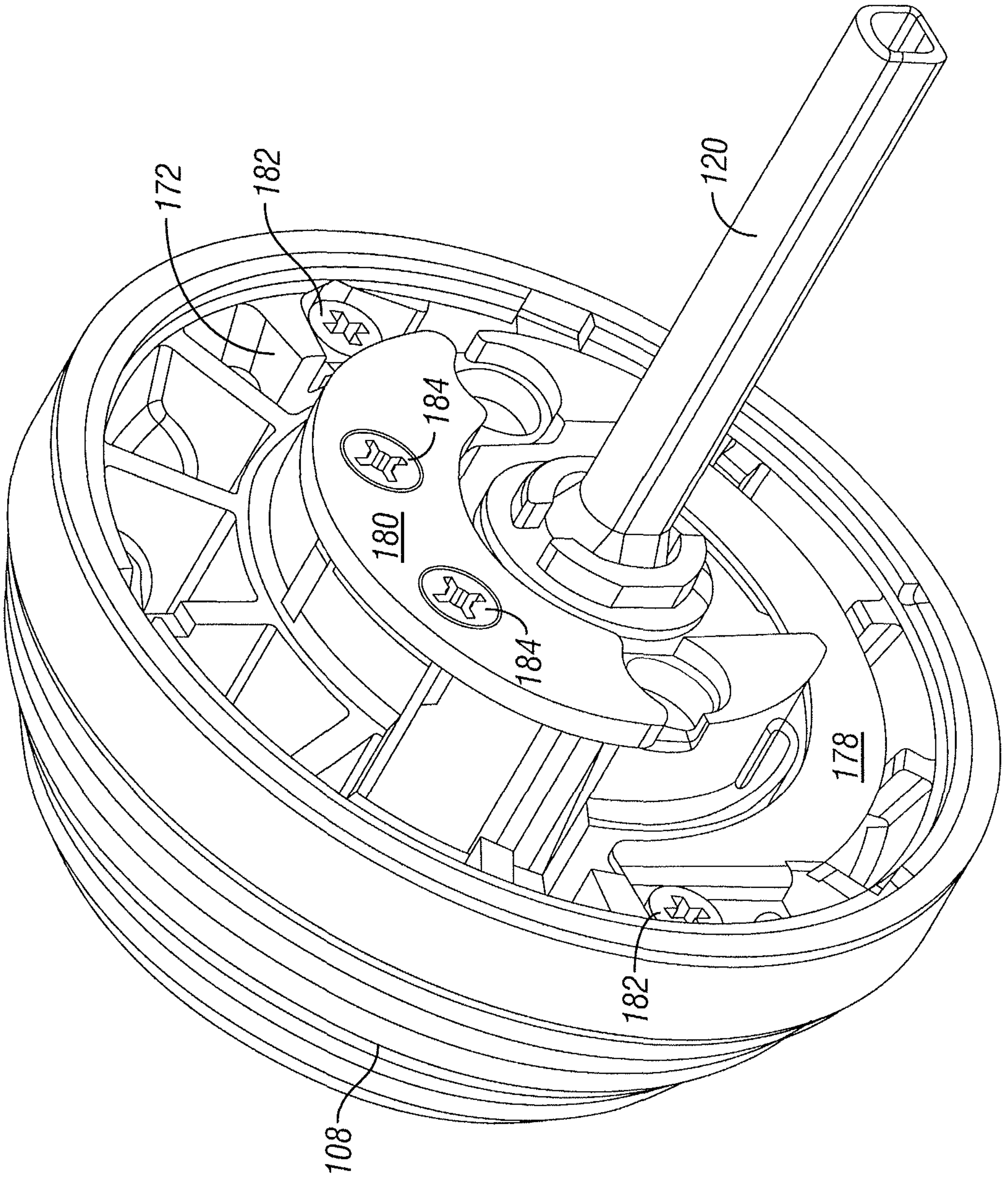
FIG. 6 is a rear perspective view of the example exterior assembly shown in FIGS. 1 and 2.
Figure 7:
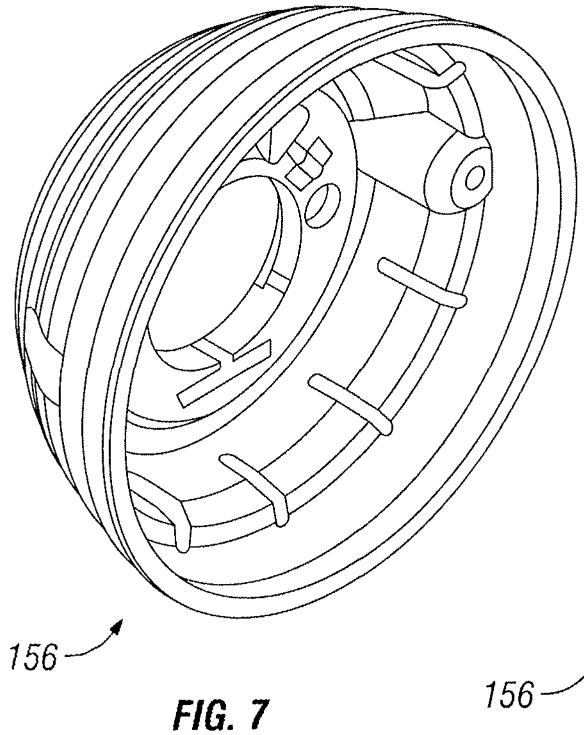
FIG. 7 is a rear perspective view of an example insulator top that could be used in the exterior assembly according to one embodiment of the disclosure.
Figure 8:
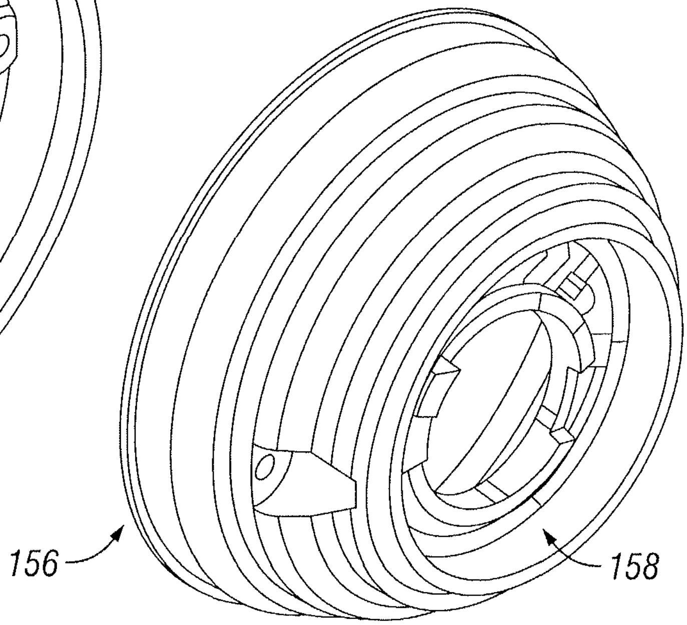
FIG. 8 is a front perspective view of the insulator shown in FIG. 7.
Figure 9:
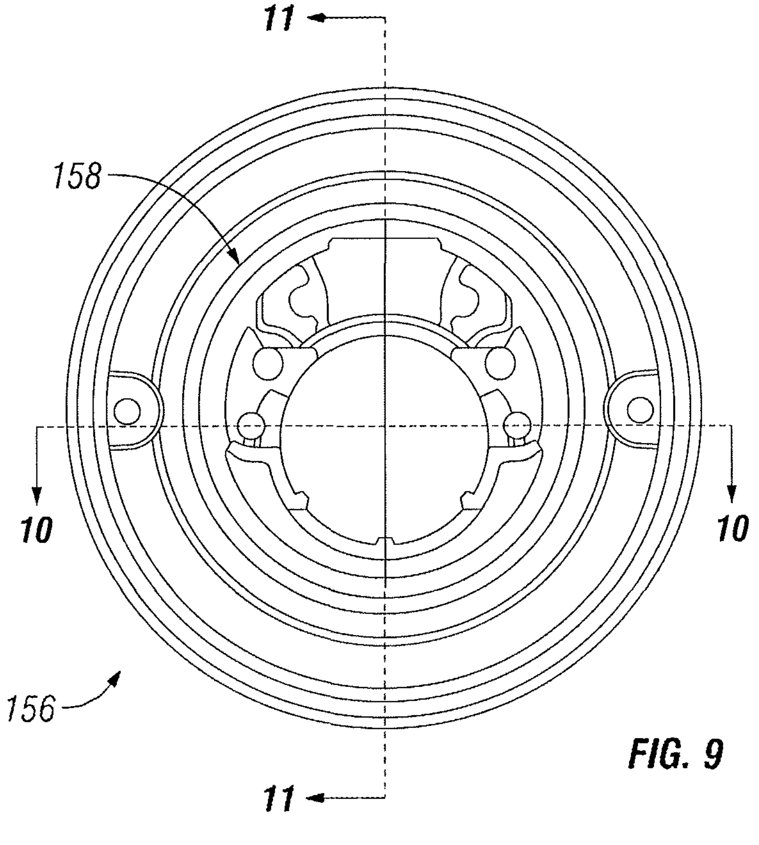
FIG. 9 is a rear view of the insulator shown in FIGS. 7 and 8.
Figure 10:
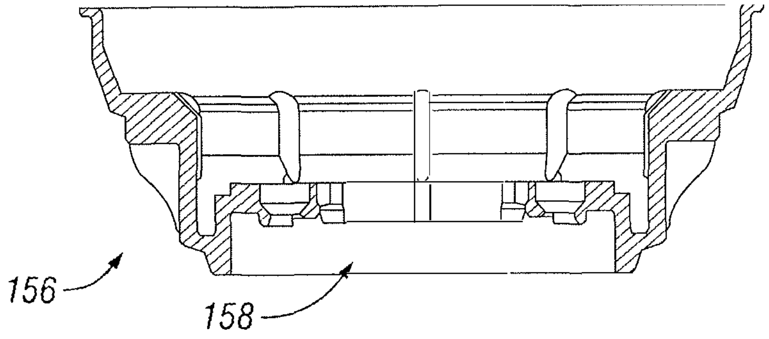
FIG. 10 is a sectional view of the insulator along line 10-10 of FIG. 9.
Figure 11:
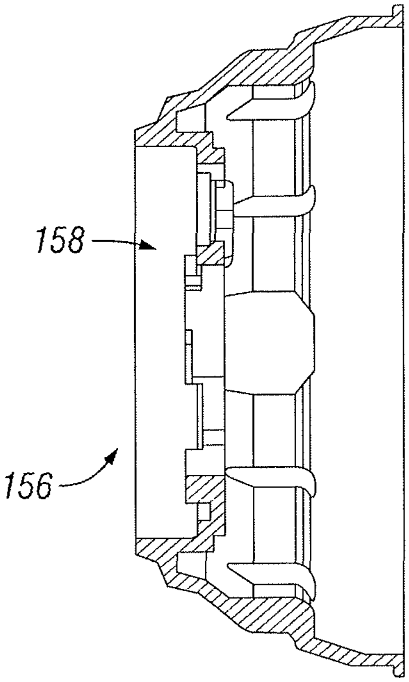
FIG. 11 is a sectional view of the insulator along line 11-11 of FIG. 9.
Figure 12:
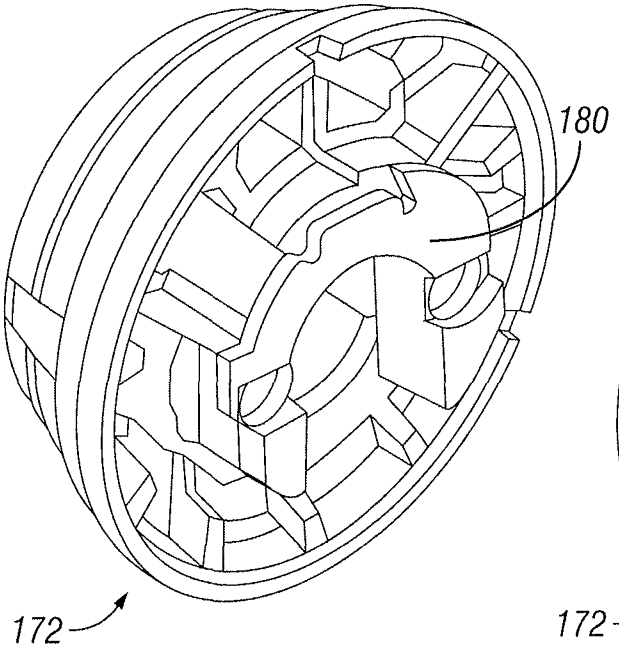
FIG. 12 is a rear perspective view of an example lockset body that could be used in the exterior assembly, according to one embodiment of the disclosure.
Figure 13:
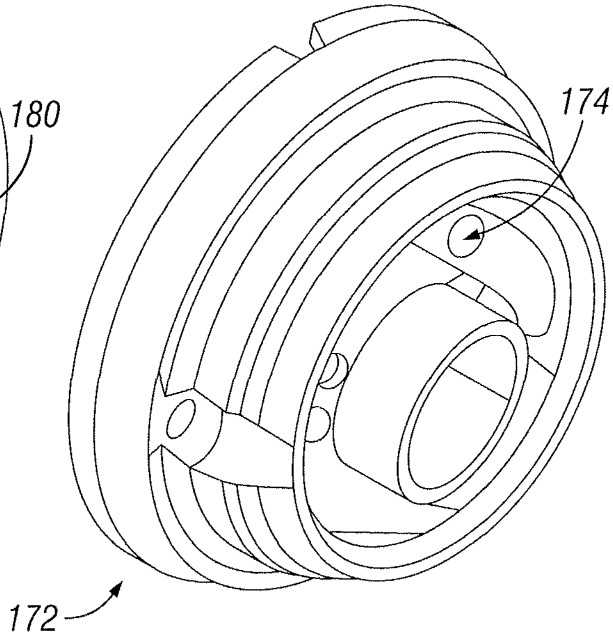
FIG. 13 is a front perspective view of the example lockset body shown in FIG. 12.
Figure 14:
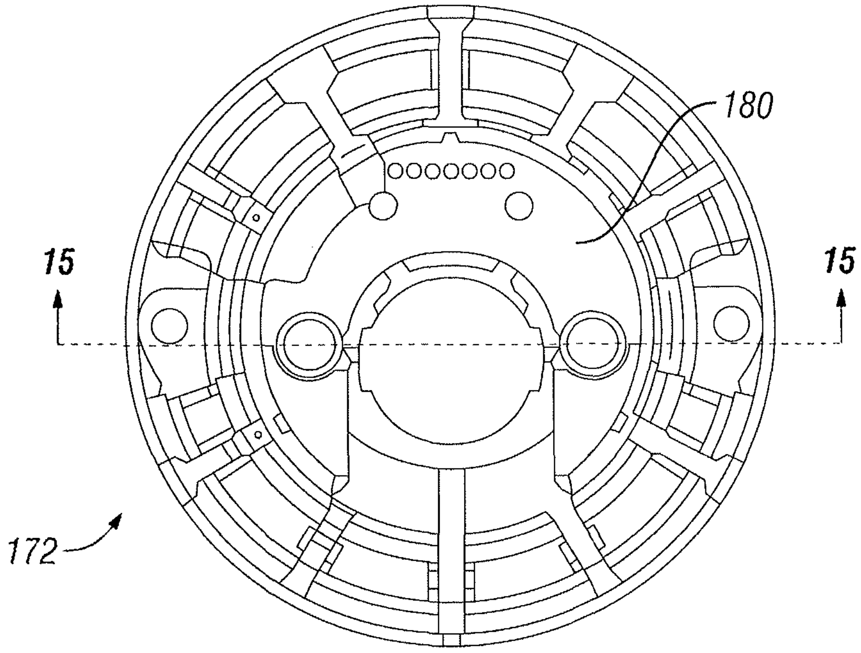
FIG. 14 is a rear view of the example lockset body shown in FIG. 12.
Figure 15:
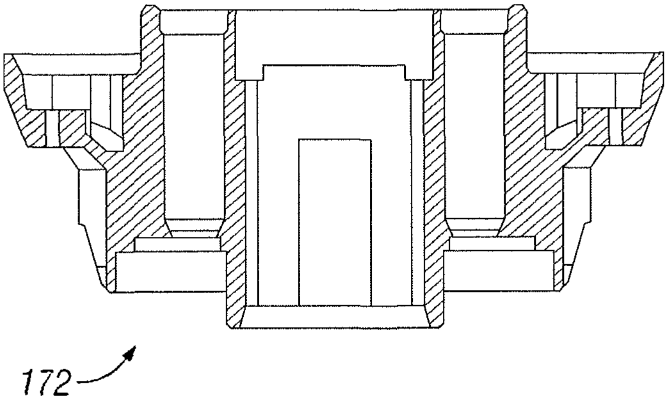
FIG. 15 is a sectional view of the example lockset body along line 15-15 of FIG. 14.
Figure 16:
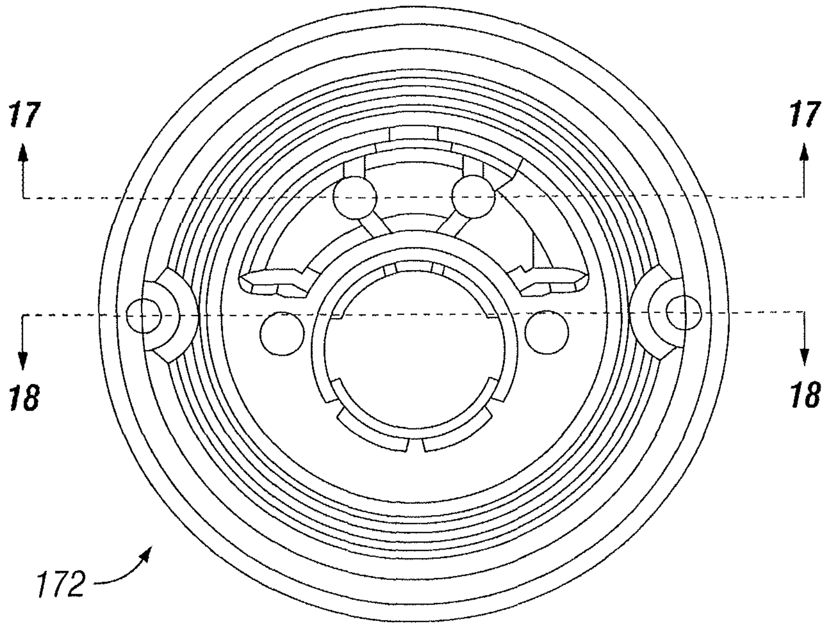
FIG. 16 is a front view of the example lockset body shown in FIG. 13.
Figure 17:
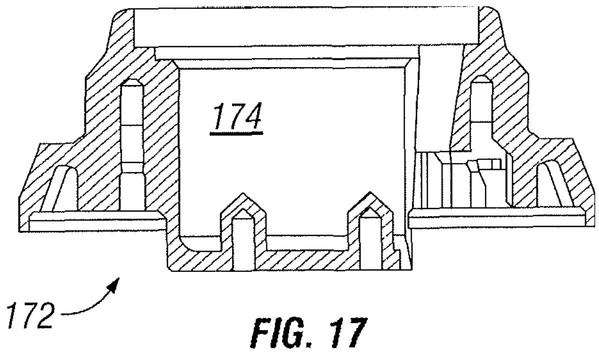
FIG. 17 is a sectional view of the example lockset body along line 17-17 of FIG. 16.
Figure 18:
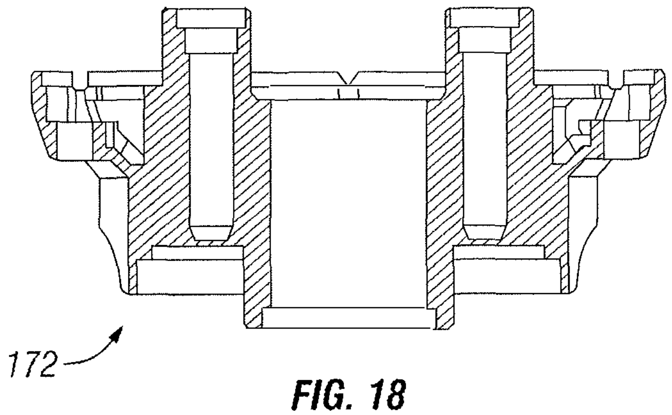
FIG. 18 is a sectional view of the example lockset body along line 18-18 of FIG. 16.
Figure 19:
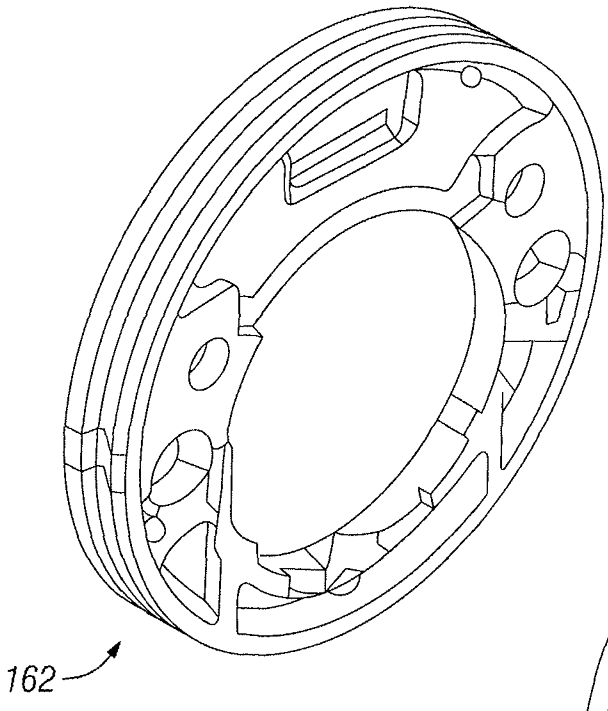
FIG. 19 is a front perspective view of an example light pipe that could be used in the exterior assembly according to one embodiment of the disclosure.
Figure 20:
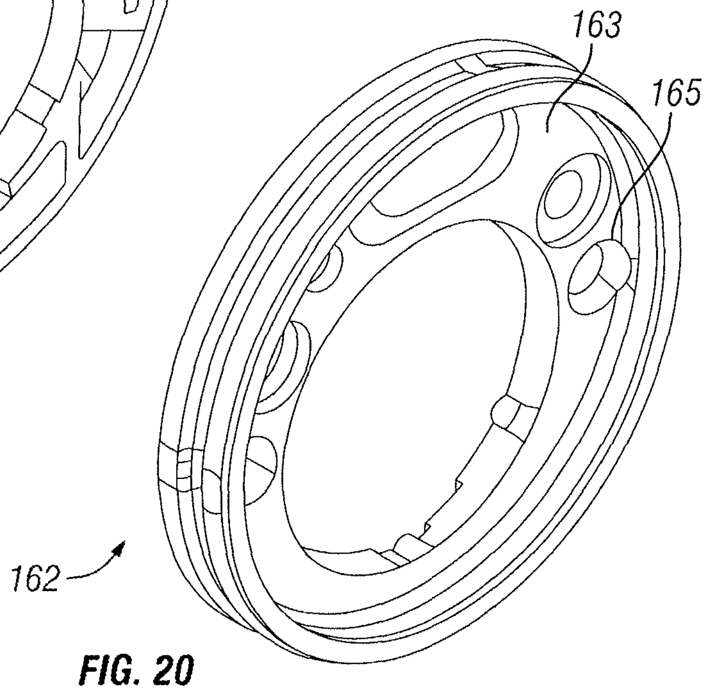
FIG. 20 is a rear perspective view of the example light pipe shown in FIG. 19.
Figure 21:
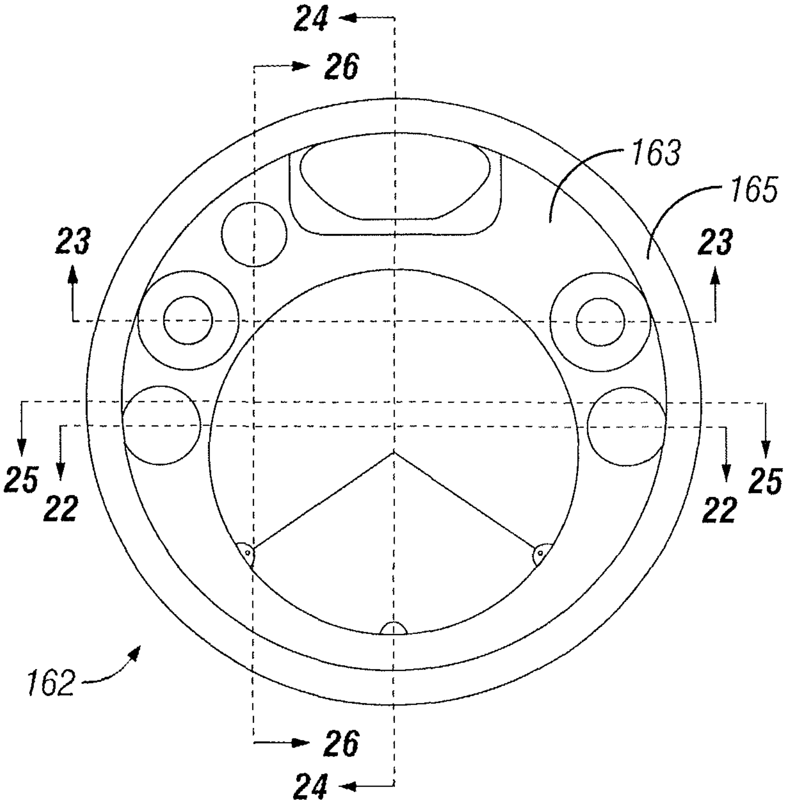
FIG. 21 is a rear view of the example light pipe shown in FIG. 20.
Figure 22:
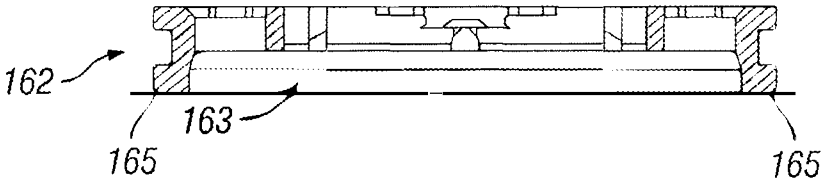
FIG. 22 is a sectional view of the example light pipe along line 22-22 of FIG. 21.
Figure 23:
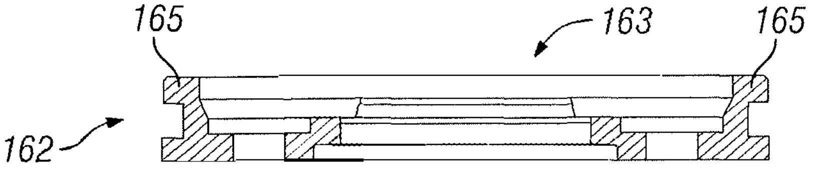
FIG. 23 is a sectional view of the example light pipe along line 23-23 of FIG. 21.
Figure 24:
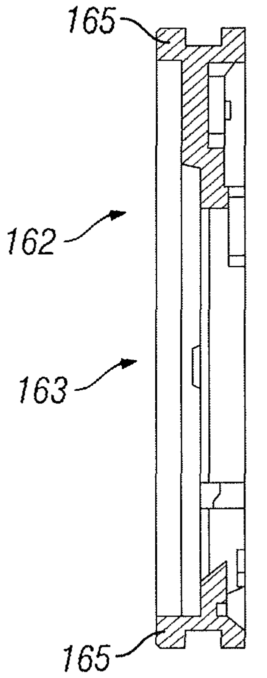
FIG. 24 is a sectional view of the example light pipe along line 24-24 of FIG. 21.
Figure 26:
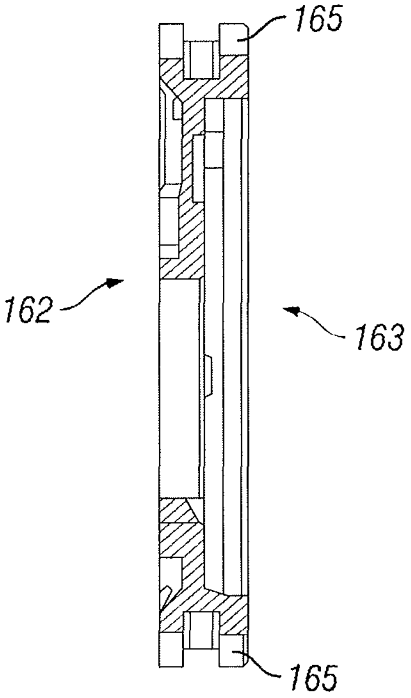
FIG. 26 is a sectional view of the example light pipe along line 26-26 of FIG. 21.
Figure 25:
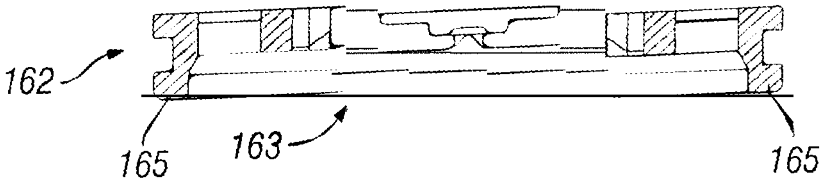
FIG. 25 is a sectional view of the example light pipe along line 25-25 of FIG. 21.

FIG. 6 is a rear perspective view of the exterior assembly 102. As can be seen in this example, the torque blade 120 extends from the rear portion of the exterior assembly for actuating the spindle 138 and the latch assembly 104. This view also shows the plate 180 and retainer 178 that have been attached to the rear portion of the cylinder housing 172.

FIGS. 28-31 show an example of how the light pipe 162 (which is shown diagrammatically) may be used to communicate with the user. In the example shown, the light pipe includes a plurality of regions that may be independently illuminated or adjusted by intensity or color. These regions may be illuminated in a coordinated manner to display information about the exterior assembly 102, such as a static image (e.g., solid or flashing the same regions) or as an animation (e.g., illuminating regions in a particular sequence). In the example shown, the light pipe 162 includes a first region 188, a second region 190, a third region 192, a fourth region 194, a fifth region 196, a sixth region 198, a seventh region 200, and an eighth region 202. Although eight regions are shown in this example, more or fewer regions could be used. Although these regions are represented by a circle, these are merely shown for purposes of example to indicate a region of the light pipe 162 that may be independently drivable. Consider an example in which the user has provided an authentication code to the lock assembly 100 and would like to touch the cylinder guard cover 108 to unlock the lock assembly 100. One example communication that may be made by the light pipe 162 could be indicating the direction of movement of the bolt 124. If the bolt 124 was moving to the right, for example, the light pipe 162 may illuminate regions in a sequence to animate a clockwise movement.

Figure 28:
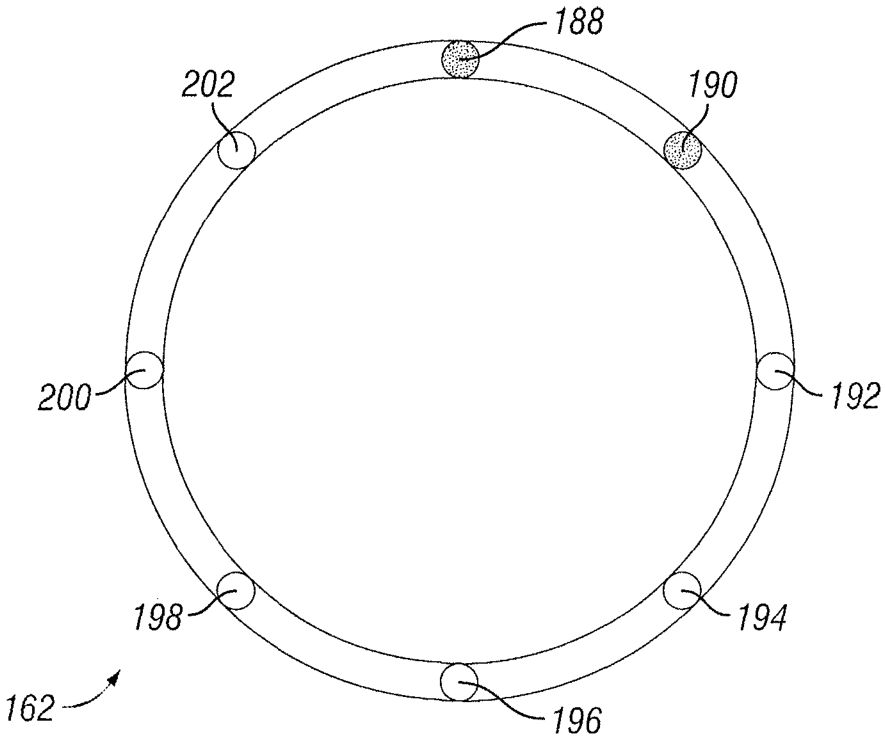
FIGS. 28-31 are a diagrammatical representation showing an example communication by the light pipe according to one embodiment of the disclosure.
Figure 29:
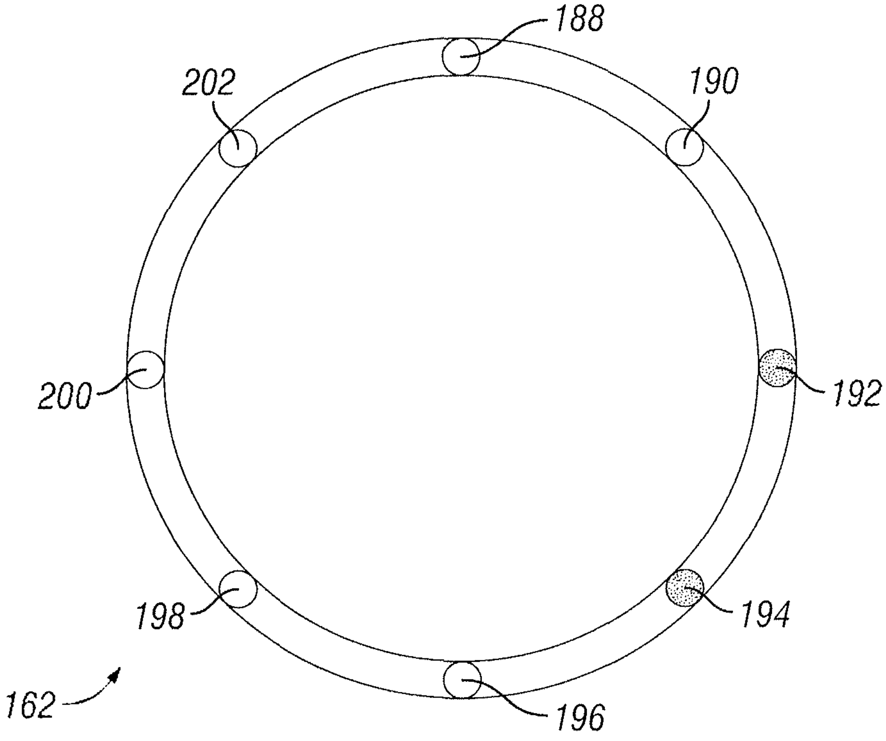
Figure 30:
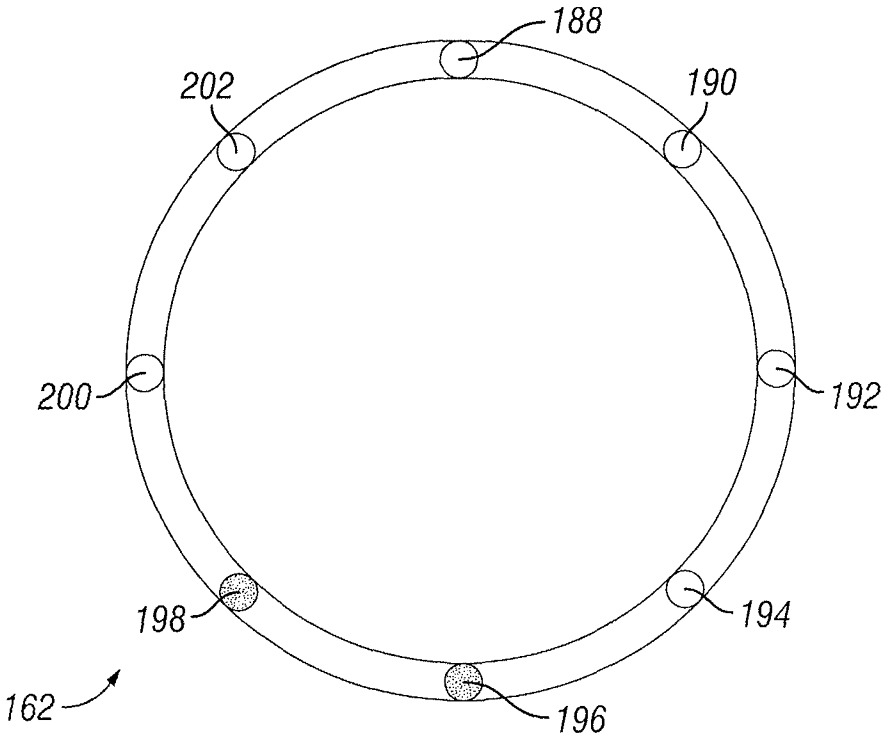
Figure 31:
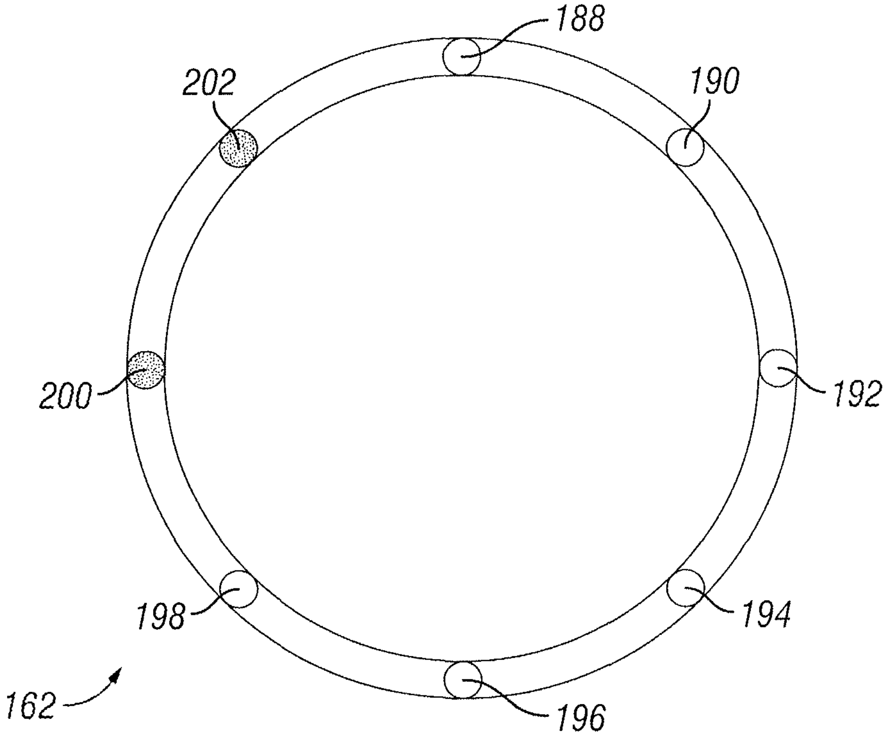
Figure 32:
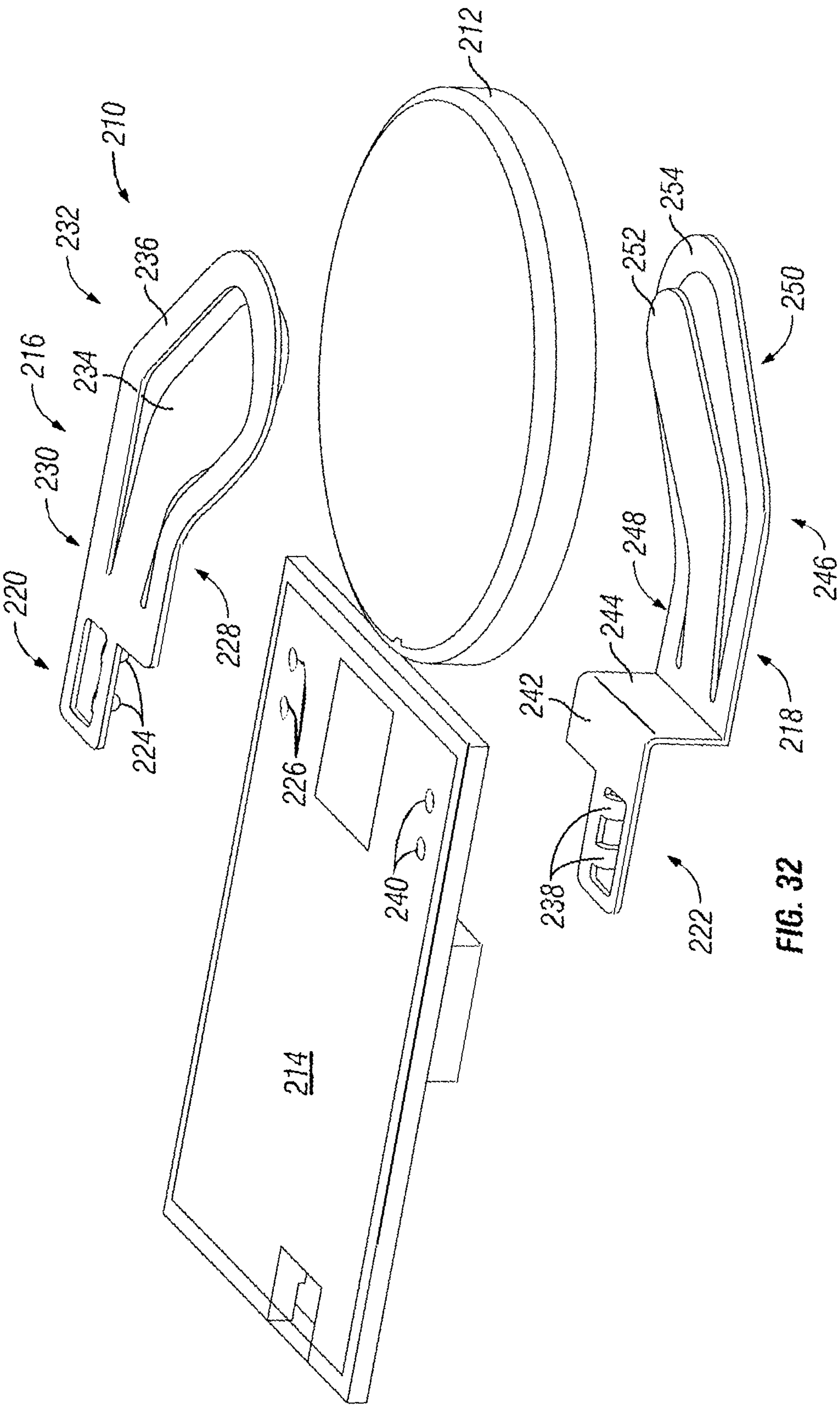
FIG. 32 is an exploded view of an example battery contact assembly that may be used with a key fob to wirelessly provide security credentials to the lock according to one embodiment of the disclosure.
Figure 33:
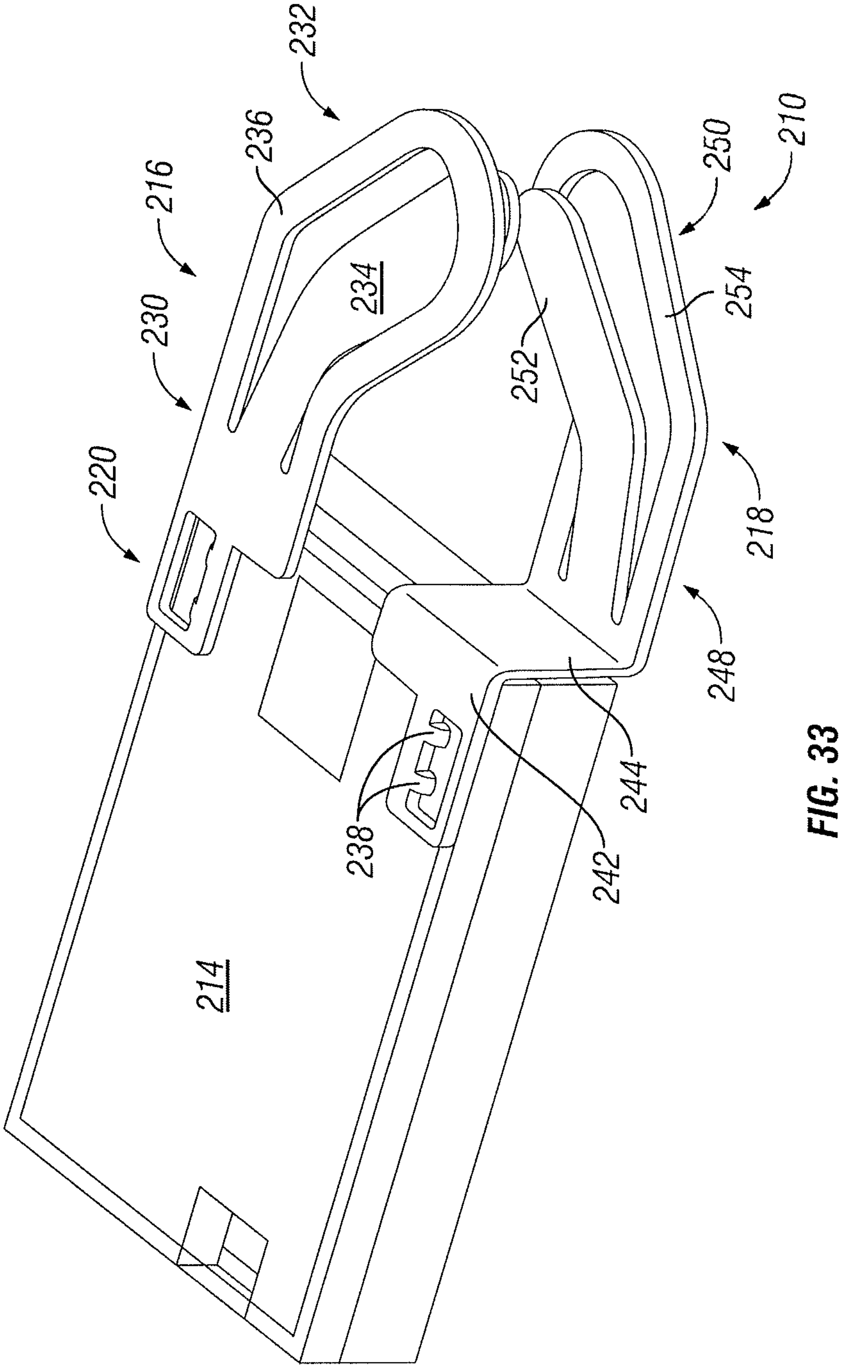
FIG. 33 is a perspective view the example battery contact assembly shown in FIG. 32 mounted to a PCB assembly.

For example, the light pipe may first indicate the first and second regions 188, 190, as shown in FIG. 28. The next two regions 192, 194 may then be illuminated and then the next regions 196, 198, and finally regions 200, 202 to show an animation of a clockwise direction. If the bolt 124 was moving to the left, the animation could be in the opposite direction. The light pipe 162 could be used to communicate a wide variety of information, such as whether the lock assembly 100 is either in a locked state or in an unlocked state. Moreover, in some embodiments, the light pipe 162 could be used to request additional information from a user, such as requesting the user touch the touch surface to either lock or unlock the lock assembly 100. If the user needs to touch the cylinder guard cover 108 multiple times to activate a certain function of the lock assembly 100, for example, the light pipe 162 could indicate the number of touches by flashing that number of times. Accordingly, the light pipe 162 acts as a user interface to communicate and interact with the user.

In operation, the user may approach the exterior assembly 102, which could cause the light pipe 162 to illuminate to indicate the user is in range. If an authentication code transmitted by the user to the lock assembly 100 is authenticated or recognized, the light pipe 162 may indicate this, such as by flashing green or some sort of animation. The user may then touch anywhere on the cylinder guard cover 108 to unlock the lock assembly 100. For example, this may cause a motor to rotate the spindle driver 144, which rotates the torque blade 120 to retract the bolt 124. As the lock assembly 100 is actuating the bolt to the retracted position, the light pipe 162 may indicate this through some sort of animation, such as a clockwise animation. When the bolt 124 has been fully retracted, the light pipe 162 may indicate that the bolt 124 is unlocked. If there was an error in retracting the bolt 124, the light pipe 162 could indicate this.

FIGS. 32-39 show a battery contact assembly 210 for electrically connecting a battery 212, such as a coin battery, to a PCB board 214 for supplying electrical power. In some cases, this assembly could be in a key fob that interacts with the lock assembly 100. For example, the PCB 214 could be configured to transmit wireless messages to the lock assembly 100, such as security credentials. The battery contact assembly 210 is configured to provide a low-profile key fob that is thinner than existing key fobs.

Figure 34:
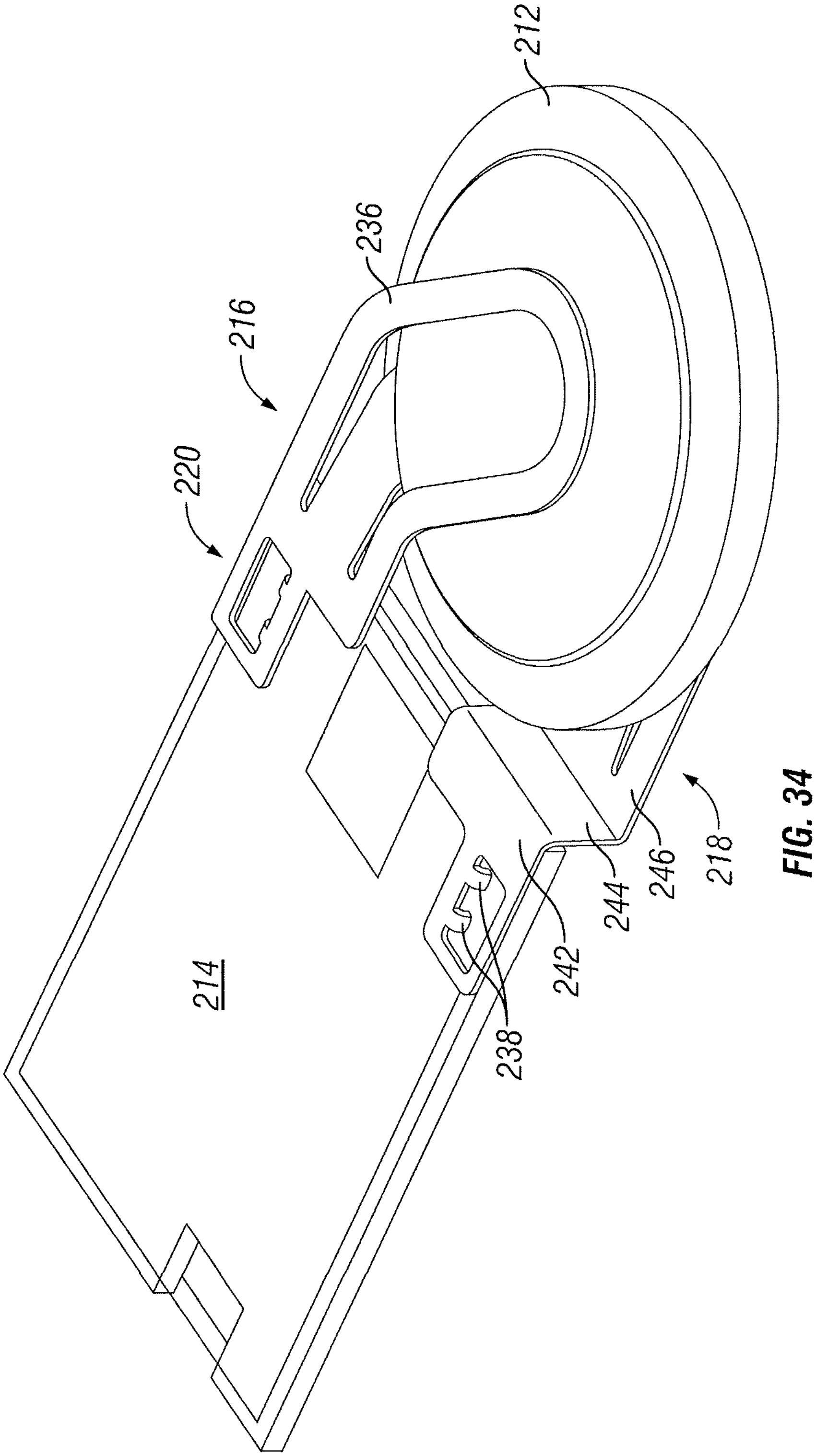
FIG. 34 is a perspective view of the example battery contact assembly shown in FIG. 33 with a battery inserted between the contacts.
Figure 35:
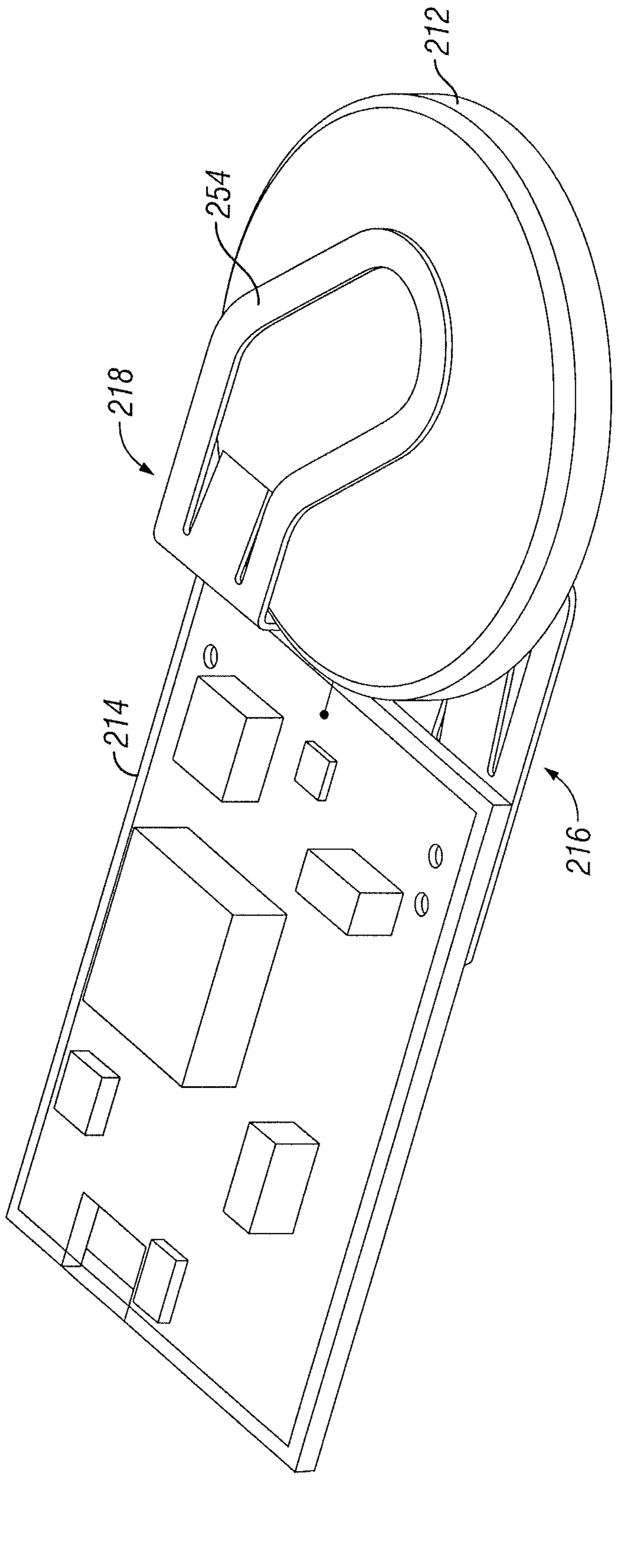
FIG. 35 is a perspective view of the example battery contact assembly shown in FIG. 33 mounted on an opposite side of the PCB.
Figure 36:
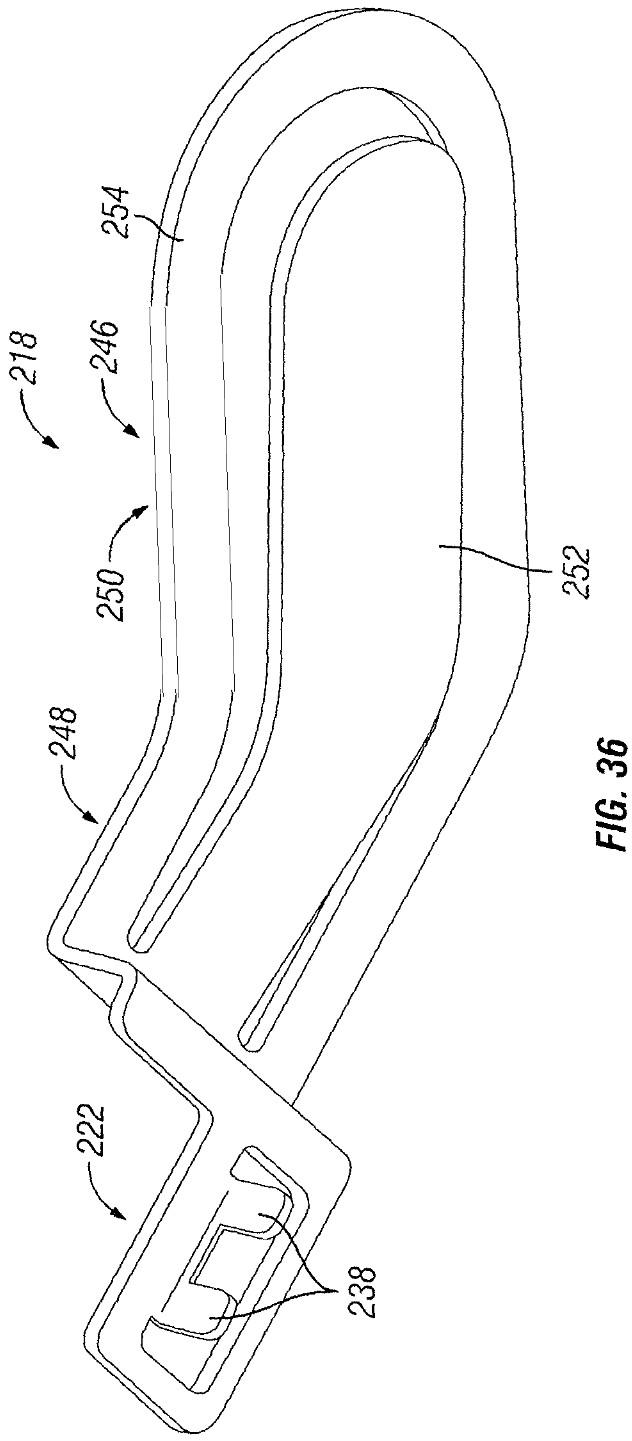
FIG. 36 is a bottom perspective view of a contact of the example battery contact assembly shown in FIG. 32.
Figure 37:
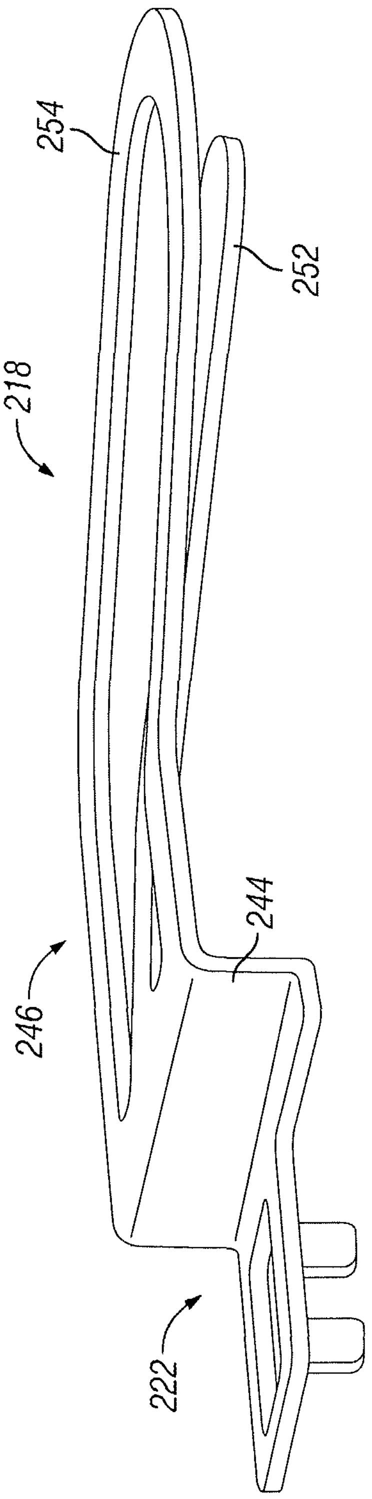
FIG. 37 is a side perspective view of the example contact shown in FIG. 36.
Figure 38:
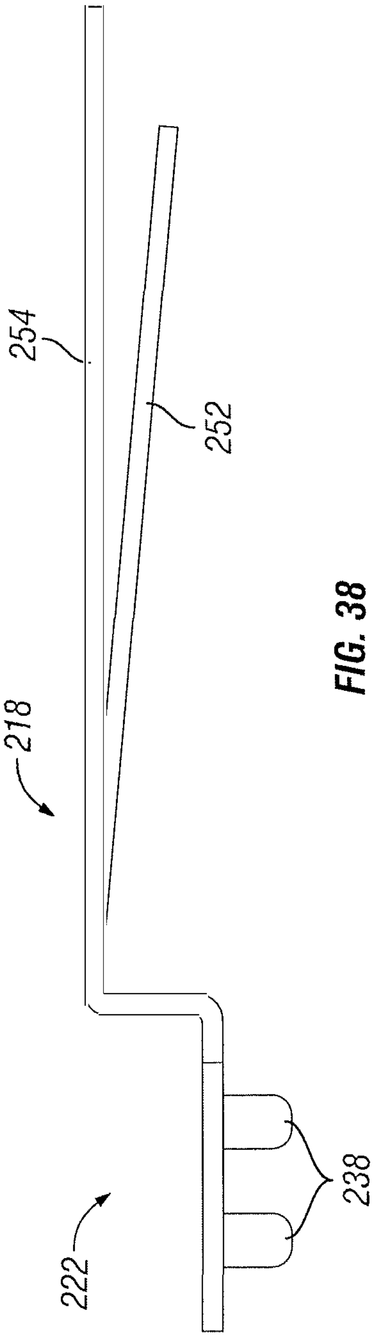
FIG. 38 is a side view of the example contact shown in FIG. 36.
Figure 39:
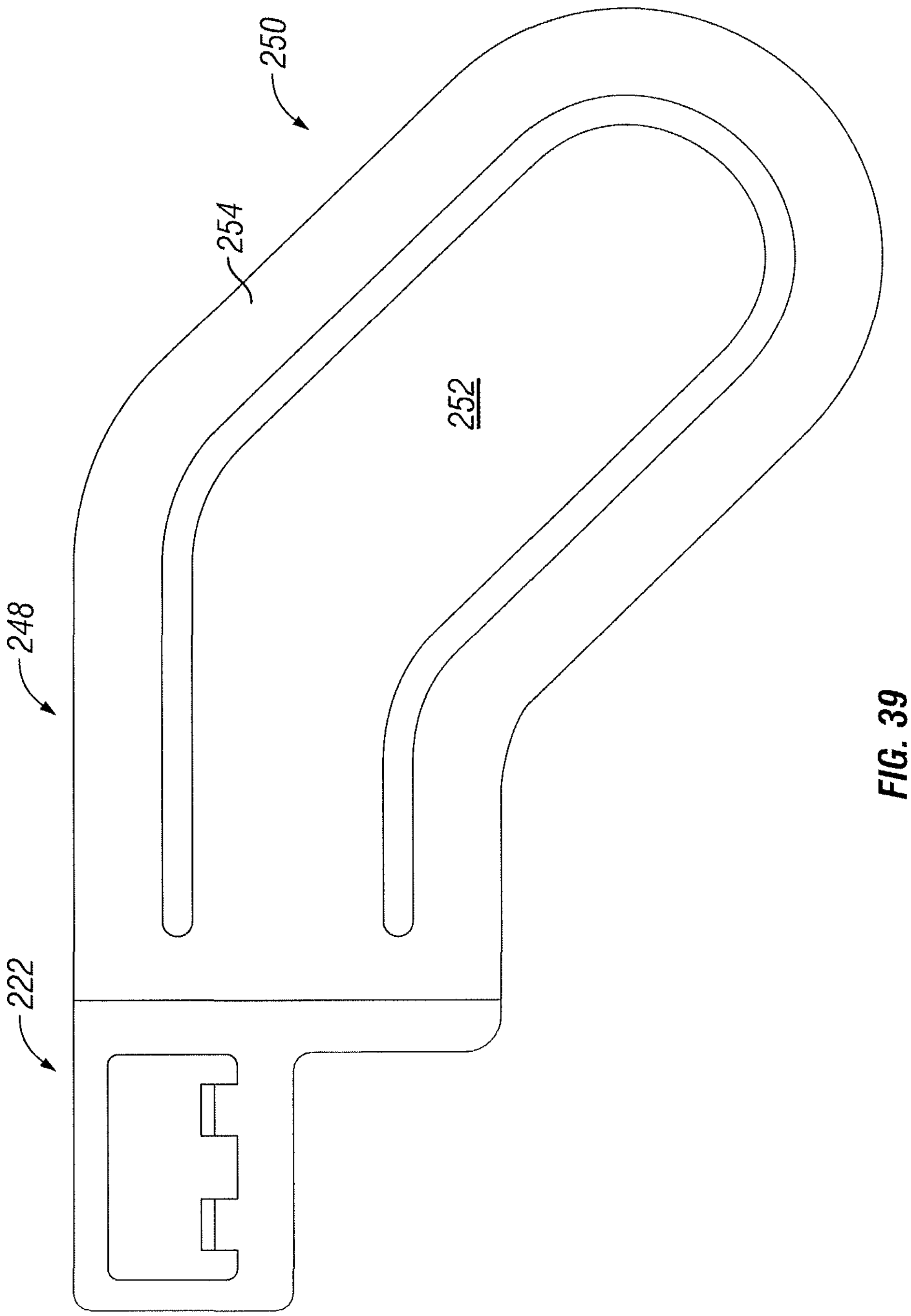
FIG. 39 is a top view of the example contact shown in FIG. 36.

In the embodiment shown, the battery contact assembly 210 includes a first contact 216 and a second contact 218. For example, the first contact 216 may connect a negative terminal of the battery 212 to the PCB 214 while the second contact 218 may connect the positive terminal of the battery 212. The first contact 216 includes a mounting portion 220 for mounting the first contact to the PCB 214. The second contact 218 includes a mounting portion 222 for mounting the second contact to the PCB 214. In the example shown, the mounting portion 220 includes legs 224 that extend through holes 226 in the PCB 214 for soldering the first contact 216 to the PCB 214 to establish an electrical connection between the PCB 214 and the first contact 216. In the example shown, the mounting portion 220 is mounted to the face of the PCB 214 (either the front or back as shown in FIGS. 34 and 35). A projection 228 extends from the PCB 214 and is suspended above the second contact 218. In the example shown, the projection 228 includes a straight portion 230 that extends along a longitudinal axis of the PCB and an angled portion 232. The projection 228 includes a spring 234 surrounded by a holder 236. The spring 234 urges against a first side of the battery to create a frictional fit with the second contact 218.

In the example shown, the mounting portion 222 of the second contact 218 includes legs 238 that extend through holes 240 in the PCB 214 for soldering the second contact 218 to the PCB 214 to establish an electrical connection between the PCB 214 and the second contact 218. In the example shown, the mounting portion 222 includes a face portion 242 and an edge portion 244 to straddle the PCB 214 (see FIGS. 33-35). As shown, the edge portion 244 has a top end extending transverse from the face portion 242 and a bottom end with a projection 246 extending from the PCB 214 and is positioned on an opposing side of the battery 212 than the first contact 216. As with the first contact 216, the second contact 218 can be mounted to either the front or back of the PCB 214. In the example shown, the projection 246 includes a straight portion 248 that extends along a longitudinal axis of the PCB and an angled portion 250. The projection 246 includes a spring 252 surrounded by a holder 254. The spring 252 urges against a second side of the battery to create a frictional fit with the first contact 216. In use, a user may slide the battery 212 between the first contact 216 and the second contact 218. The urging of springs 234, 252 on opposing faces of the battery 212 creates a frictional fit to hold the battery 212 in place. Since the first contact 216 and the second contact 218 have an electrical connection with the PCB 214, the battery 212 supplies power to the PCB 214. If the user wants to remove the battery 212, the battery 212 may pulled out with sufficient force to overcome the friction of the springs 234, 252.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A lockset comprising:

a latch assembly including a bolt movable between an extended position and a retracted position;

a controller configured to electronically control movement of the bolt between the extended position and the retracted position; and an exterior assembly including:

a mechanical lock assembly configured to manually actuate the bolt between the extended position and the retracted position;

a cylinder guard cover at least partially surrounding the mechanical lock assembly and providing a touch surface, the touch surface electrically coupled with the controller; and a front cover made of non-conductive and generally RF transparent material;

wherein the controller actuates movement of the bolt between the extended position and the retracted position in response to:

receiving credentials from a user device; and receiving a touch input at the touch surface.

2. The lockset of claim 1, wherein the touch surface is an entire external surface of the cylinder guard cover.

3. The lockset of claim 1, wherein the front cover forms a generally planar, circular front surface positioned around the front end of the mechanical lock assembly between the front end of the mechanical lock assembly and the cylinder guard cover.

4. The lockset of claim 1, wherein the front cover is entirely exterior to a door.

5. The lockset of claim 1, wherein the cylinder guard cover has a tapered shape from a rear portion positionable immediately adjacent to a door to a front portion extending away from the door.

6. The lockset of claim 1, further comprising:

an interior assembly, wherein the interior assembly and the exterior assembly are connected to the latch assembly through a bore in the door.

7. The lockset of claim 1, wherein the non-conductive and generally RF transparent material is plastic.

8. A lockset comprising:

a latch assembly including a bolt movable between an extended position and a retracted position;

a controller configured to electronically control movement of the bolt between the extended position and the retracted position; and an exterior assembly including:

a mechanical lock assembly configured to manually actuate the bolt between the extended position and the retracted position;

a touch-sensitive cylinder guard cover electrically coupled with the controller; and a non-touch-sensitive front cover, the front cover made of generally RF transparent material;

wherein the controller actuates movement of the bolt between the extended position and the retracted position in response to:

receiving credentials from a user device; and receiving a touch input at the cylinder guard cover.

9. The lockset of claim 8, wherein an entire external surface of the cylinder guard cover is touch sensitive.

10. The lockset of claim 8, wherein the generally RF transparent material is a non-conductive material.

11. The lockset of claim 8, further comprising:

an interior assembly including:

a motor, the motor connected to the bolt via a torque blade to move the bolt between the extended position and the retracted position in response to actuation from the controller.

12. The lockset of claim 8, wherein the cylinder guard cover is frustum-shaped.

13. The lockset of claim 12, wherein the cylinder guard cover is generally frustoconical.

14. The lockset of claim 8, wherein the cylinder guard cover concentrically surrounds the front cover and extends to a circular mounting footprint.

15. The lockset of claim 8, wherein the front cover is entirely external to a door.

16. A method of operating a lockset, the method comprising:

receiving a touch input at a touch-sensitive cylinder guard cover;

receiving credentials from a user device, wherein the credentials received by an antenna positioned behind a non-touch-sensitive, RF-transparent front cover; and in response to receiving the touch and the credentials, actuating a motor to move a bolt between extended and retracted positions.

17. The method of claim 16, further comprising:

validating the received credentials, wherein actuating the motor is further in response to validating the received credentials.

18. The method of claim 16, wherein the touch-sensitive cylinder guard cover is a capacitive touch surface.

19. The method of claim 16, wherein the antenna is housed within the touch-sensitive cylinder guard cover.

20. The method of claim 16, further comprising:

transmitting a signal from the antenna to the user device, wherein the signal is transmitted through the non-touch-sensitive, RF-transparent front cover.

* * * * *